United States Patent
Mishra

(10) Patent No.: US 10,267,639 B2
(45) Date of Patent: Apr. 23, 2019

(54) METHOD AND APPARATUS FOR VALIDATING POTENTIAL POINTS OF INTEREST USING USER AND DEVICE CHARACTERISTICS

(71) Applicant: Nokia Technologies Oy, Espoo (FI)

(72) Inventor: Pranav Mishra, Bangalore (IN)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/648,651

(22) PCT Filed: Dec. 3, 2013

(86) PCT No.: PCT/FI2013/051127
§ 371 (c)(1),
(2) Date: May 29, 2015

(87) PCT Pub. No.: WO2014/087050
PCT Pub. Date: Jun. 12, 2014

(65) Prior Publication Data
US 2015/0308838 A1 Oct. 29, 2015

(30) Foreign Application Priority Data
Dec. 4, 2012 (IN) .......................... 5059/CHE/2012

(51) Int. Cl.
*G01C 21/26* (2006.01)
*G01C 21/32* (2006.01)
(Continued)

(52) U.S. Cl.
CPC ............ *G01C 21/26* (2013.01); *G01C 21/32* (2013.01); *G01C 21/3476* (2013.01);
(Continued)

(58) Field of Classification Search
CPC .... G01C 21/26; G01C 21/32; G01C 21/3476; G06Q 10/101; G06Q 30/0282;
(Continued)

(56) References Cited

U.S. PATENT DOCUMENTS 8,165,409 B2 4/2012 Ritzau et al.
9,122,693 B2 9/2015 Blom et al.
(Continued)

FOREIGN PATENT DOCUMENTS

JP 2009-043057 A 2/2009
KR 2008-0037977 A 5/2008
(Continued)

OTHER PUBLICATIONS

International Search Report and Written Opinion received for corresponding Patent Cooperation Treaty Application No. PCT/FI2013/051127, dated Feb. 10, 2015, 15 pages.
(Continued)

*Primary Examiner* — Tamara L Weber
(74) *Attorney, Agent, or Firm* — Mintz Levin Cohn Ferris Glovsky and Popeo, P.C.

(57) ABSTRACT

An approach is provided for validating potential points of interest using device and user characteristics. The validation platform processes and/or facilitates a processing of location information associated with at least one device to determine one or more potential points of interest visited by the at least one device. Next, the validation platform causes, at least in part, a tagging of the one or more potential points of interest with one or more characteristics of the at least one device, one or more users of the at least one device, or a combination thereof. Then, the validation platform causes, at least on part, a validation of the one or more potential points of interest based, at least in part, on the one or more characteristics as captured by at least one other device, one or more
(Continued)

other users of the at least one other device, or a combination thereof.

25 Claims, 19 Drawing Sheets

(51) Int. Cl.
    *G01C 21/34*     (2006.01)
    *G06Q 10/10*     (2012.01)
    *G06Q 30/02*     (2012.01)
    *G06F 17/30*     (2006.01)
    *G01C 21/36*     (2006.01)
    *H04W 4/029*     (2018.01)

(52) U.S. Cl.
    CPC ... *G01C 21/3679* (2013.01); *G06F 17/30241* (2013.01); *G06F 17/30876* (2013.01); *G06Q 10/101* (2013.01); *G06Q 30/0261* (2013.01); *G06Q 30/0282* (2013.01); *H04W 4/029* (2018.02)

(58) Field of Classification Search
    CPC .......... G06Q 30/0261; G06F 17/30876; G06F 17/30241; H04W 4/028
    See application file for complete search history.

(56) References Cited

U.S. PATENT DOCUMENTS

| | | | |
|---|---|---|---|
| 9,141,960 B2 * | 9/2015 | Feldman | G06F 17/30867 |
| 2003/0036848 A1 | 2/2003 | Sheha et al. | |
| 2007/0281716 A1 | 12/2007 | Altman et al. | |
| 2009/0012955 A1 * | 1/2009 | Chu | G06Q 30/0261 |
| 2009/0186605 A1 | 7/2009 | Apfel et al. | |
| 2009/0315766 A1 | 12/2009 | Khosravy et al. | |
| 2010/0057351 A1 | 3/2010 | Woo | |
| 2010/0131187 A1 | 5/2010 | Lai et al. | |
| 2010/0161211 A1 | 6/2010 | Chang | |
| 2010/0191459 A1 * | 7/2010 | Carter | G01C 21/32 701/532 |
| 2010/0277611 A1 | 11/2010 | Holt et al. | |
| 2011/0055204 A1 | 3/2011 | Jung | |
| 2011/0112762 A1 * | 5/2011 | Gruijters | G01C 21/32 701/532 |
| 2011/0131235 A1 | 6/2011 | Petrou et al. | |
| 2011/0150324 A1 | 6/2011 | Ngan et al. | |
| 2011/0153191 A1 | 6/2011 | Dhanani | |
| 2011/0212717 A1 * | 9/2011 | Rhoads | G06F 17/30241 455/420 |
| 2011/0218992 A1 | 9/2011 | Waldman et al. | |
| 2011/0235923 A1 | 9/2011 | Weisenburger et al. | |
| 2011/0313657 A1 | 12/2011 | Myllymaki et al. | |
| 2012/0202525 A1 | 8/2012 | Pettini | |
| 2013/0226857 A1 * | 8/2013 | Shim | G06N 5/04 706/52 |
| 2013/0260795 A1 * | 10/2013 | Papakipos | H04W 4/023 455/456.3 |

FOREIGN PATENT DOCUMENTS

| | | |
|---|---|---|
| WO | 2003/054654 A2 | 7/2003 |
| WO | 20110727744 A1 | 6/2011 |
| WO | 2012/164150 A1 | 12/2012 |

OTHER PUBLICATIONS

Gavalas, D, et al. Mobile Recommender Systems in Tourism, eCOMPASS-TR-009. Technical Report [online], Oct. 2012 [retrieved on Jan. 29, 2014]. Retrieved from the internet: <URL: http://www.ecompass-project.eu/sites/default/files/ECOMPASS-TR-009.pdf> the whole document, in particular Sections 1-3, 4.1, 4.3-4.5, 5.3.1, 5.3.3; Table 2; Fig. 2

Basu, Roy, S. et al. Interactive Itinerary Planning, IEEE 27th International Conference on Data Engineering, Apr. 2011, pp. 15-26. <DOI: 10.1109/ICDE.2011.5767920>.

Zenger, GB, Trajectory-Based Point of Interest Recommendation. M. Sc. Thesis [retrieved on Jan. 27, 2014] Retrieved from the internet: <URL:http//summit.sfu.ca/system/files/iritems1/9832/ETD4883.pdf>.

"VIRaL: Visual Image Retrieval and Localization", Image and Video Analysis, Retrieved on Jul. 19, 2016, Webpage available at : http://image.ntua.gr/iva/tools/viral.

"Large-scale Image Retrieval using Scene Maps", Image and Video Analysis, Retrieved on Jul. 19, 2016, Webpage available at : http://www.image.ntua.gr/iva/research/scene_maps/.

Extended European Search Report received for corresponding European Patent Application No. 13859933.7, dated Jun. 27, 2016, 9 pages.

Zheng et al., "Learning Travel Recommendations From User-Generated GPS Traces", ACM Trans. Asian Language Information Processing, vol. 6, No. 3, Nov. 2007, pp. 1-29.

\* cited by examiner

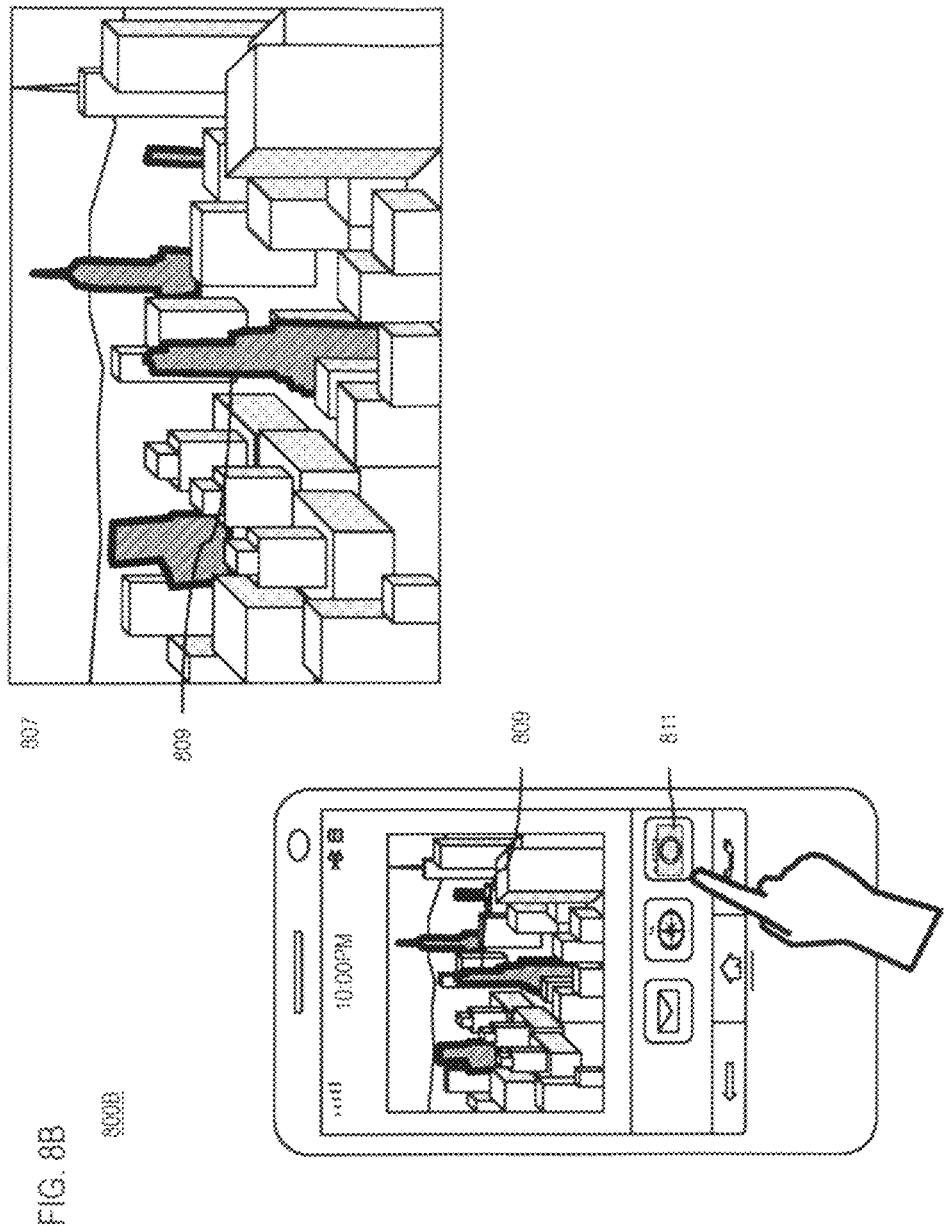

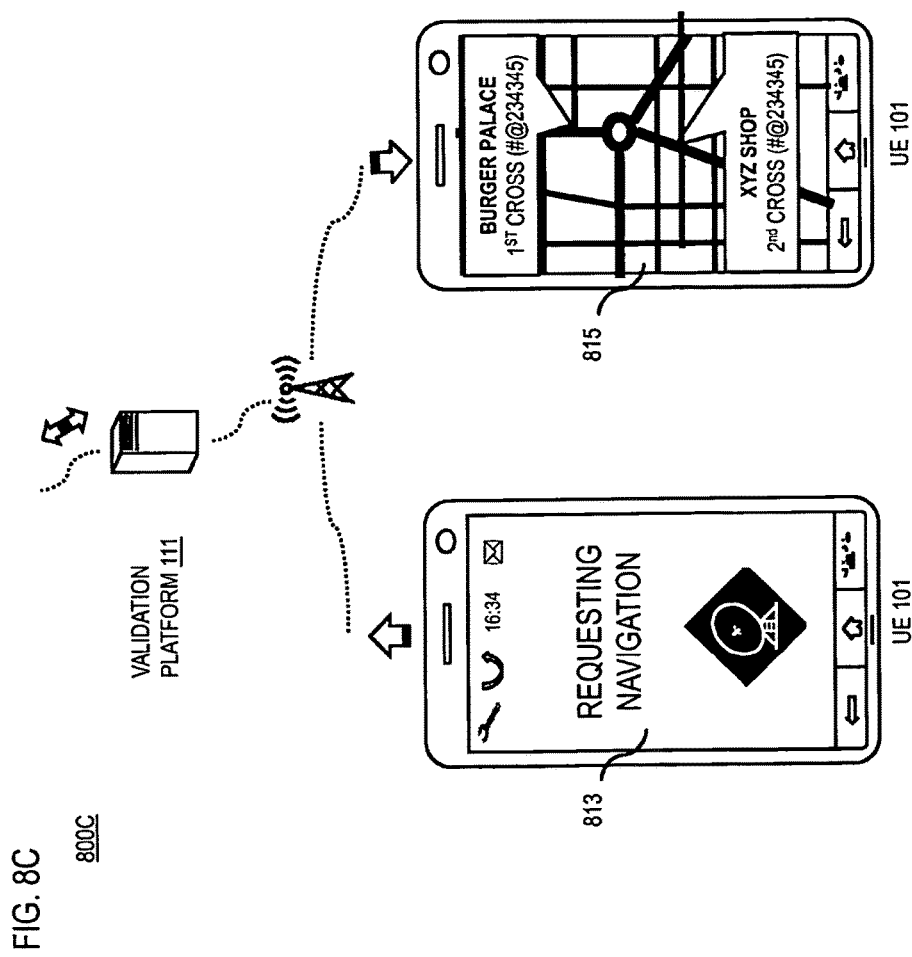

METHOD AND APPARATUS FOR VALIDATING POTENTIAL POINTS OF INTEREST USING USER AND DEVICE CHARACTERISTICS

RELATED APPLICATION

This application was originally filed as Patent Cooperation Treaty Application No. PCT/FI2013/051127 filed Dec. 3, 2013 which claims priority benefit to Indian Patent Application No. 5059/CHE/2012, filed Dec. 4, 2012.

BACKGROUND

Service providers and device manufacturers (e.g., wireless, cellular, etc.) are continually challenged to deliver value and convenience to consumers by, for example, providing compelling network services. One area of interest has been using devices to develop reliable collections of points of interest (POIs), especially in developing areas. For example, Global Positioning System (GPS) applications may provide or include POIs that user devices may access. In addition, user devices may contribute to adding new POIs. Nonetheless, the POIs presented by the applications and/or marked by user devices may contain errors. As such, service providers and device manufacturers face significant technical challenges in providing up-to-date, accurate, and reliable POIs. In other words, service providers and device manufacturers face significant technical challenges in providing POIs that are validated for their accuracy.

SOME EXAMPLE EMBODIMENTS

Therefore, there is a need for an approach for validating potential points of interest using device and user characteristics.

According to one embodiment, a method comprises processing and/or facilitating a processing location information associated with at least one device to determine one or more potential points of interest visited by the at least one device. The method also comprises causing, at least in part, a tagging of the one or more potential points of interest with one or more characteristics of the at least one device, one or more users of the at least one device, or a combination thereof. The method further comprises causing, at least in part, a validation of the one or more potential points of interest based, at least in part, on the one or more characteristics as captured by at least one other device, one or more other users of the at least one other device, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing location information associated with at least one device to determine one or more potential points of interest visited by the at least one device. The apparatus is also caused to cause, at least in part, a tagging of the one or more potential points of interest with one or more characteristics of the at least one device, one or more users of the at least one device, or a combination thereof. The apparatus is further caused to cause, at least in part, a validation of the one or more potential points of interest based, at least in part, on the one or more characteristics as captured by at least one other device, one or more other users of the at least one other device, or a combination thereof.

According to another embodiment, a computer-readable storage medium carries one or more sequences of one or more instructions which, when executed by one or more processors, cause, at least in part, an apparatus to process and/or facilitate a processing location information associated with at least one device to determine one or more potential points of interest visited by the at least one device. The apparatus is also caused to cause, at least in part, a tagging of the one or more potential points of interest with one or more characteristics of the at least one device, one or more users of the at least one device, or a combination thereof. The apparatus is further caused to cause, at least in part, a validation of the one or more potential points of interest based, at least in part, on the one or more characteristics as captured by at least one other device, one or more other users of the at least one other device, or a combination thereof.

According to another embodiment, an apparatus comprises means for processing and/or facilitating a processing location information associated with at least one device to determine one or more potential points of interest visited by the at least one device. The apparatus also comprises means for causing, at least in part, a tagging of the one or more potential points of interest with one or more characteristics of the at least one device, one or more users of the at least one device, or a combination thereof. The apparatus further comprises means for causing, at least in part, a validation of the one or more potential points of interest based, at least in part, on the one or more characteristics as captured by at least one other device, one or more other users of the at least one other device, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method disclosed herein for validating potential points of interest using device and user characteristics.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 8A-8G are diagrams of user interfaces utilized in the processes of FIG. 3, according to various embodiments;

DESCRIPTION OF SOME EMBODIMENTS

Examples of a method, apparatus, and computer program for validating potential points of interest using device and user characteristics are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
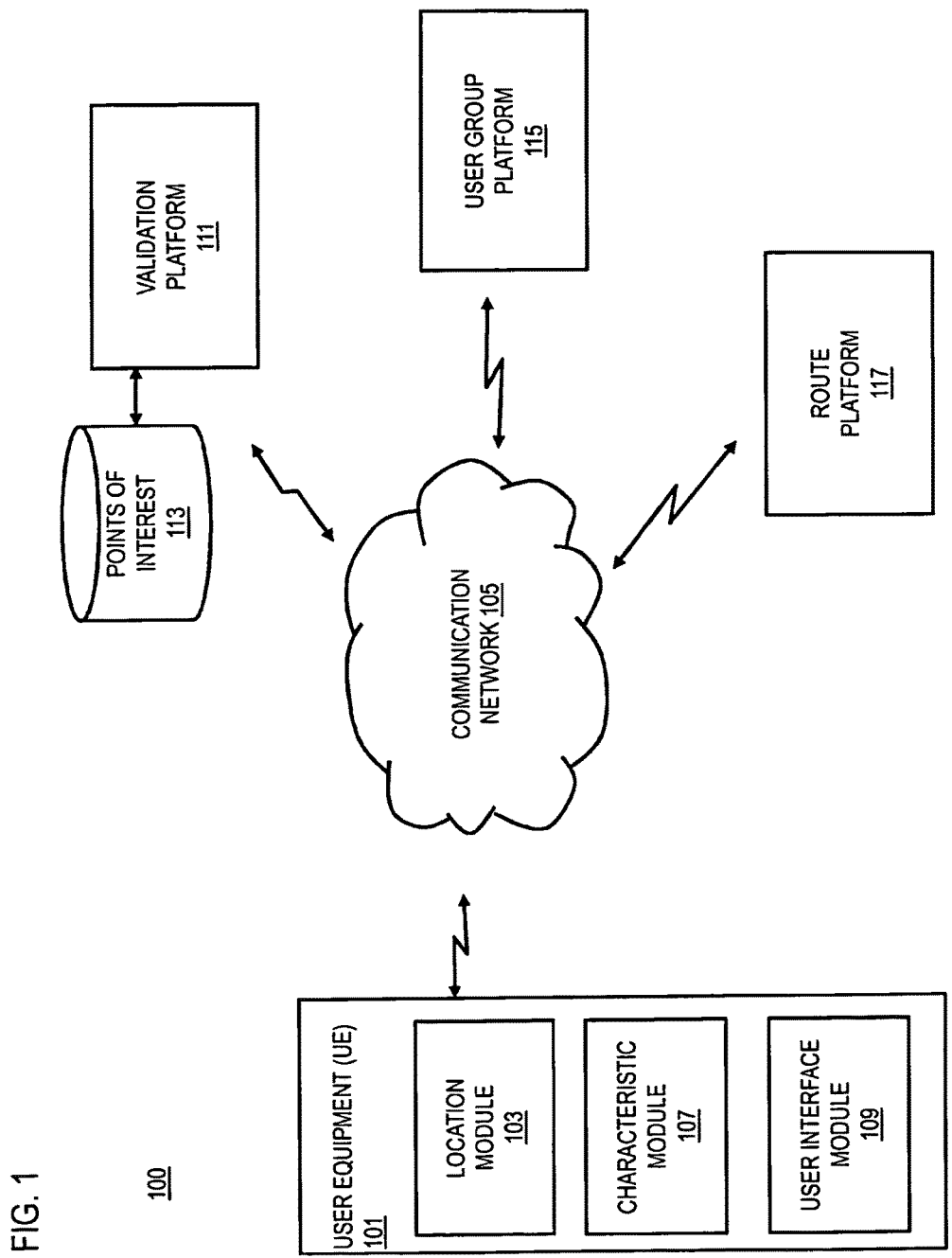
FIG. 1 is a diagram of a system capable of validating potential points of interest using device and user characteristics, according to one embodiment.

FIG. 1 is a diagram of a system capable of validating potential points of interest using device and user characteristics, according to one embodiment. As discussed, recent technological advances create widespread uses of mapping services and uses for points of interest (POI) information. However, landmarks and POI may appear or change frequently, especially in developing areas. For example, in new market economies, new urban areas may quickly develop with restaurants, theatre, and schools. Traditional applications and service providers face challenges in keeping an updated list of the most current POIs. Now, user devices may contribute to mark POIs and add POIs to mapping applications, but user error is introduced in user creation of POIs. For example, users may provide inaccurate information or mark locations incorrectly.

To address this problem, a system 100 of FIG. 1 introduces the capability to validate potential points of interest using device and user characteristics. For example, points of interest may continually change or increase, especially in a developing area. The system 100 may ensure that potential POIs are accurate, and once potential POIs are validated past a threshold, the system 100 may show that the potential POI is reliable enough to be uploaded to a navigation database as a POI and/or upload the potential POI to a navigation database. In one embodiment, the system 100 may determine a processing of location information associated with at least one device to determine one or more potential POIs visited by the at least one device. Then, the system 100 may cause, at least in part, a tagging of the potential POIs with characteristics of the device, users of the device, or a combination thereof. For example, the system 100 may first establish potential POIs by creating some parameters that may indicate a potential POI. For instance, the system 100 may monitor location information of a device, where the system 100 detects when the device stagnant at a location for a period of time past a pre-set time threshold. Here, system 100 may define the parameter that a device remaining stagnant may be an implication that a device is in a potential POI.

For example, the system 100 may monitor a device where it is determined that a person is moving along a street. When the person stops, enters a coffee shop, and sits down for a coffee, the system 100 may detect that the person's device has remained in the same location for over a time threshold of five minutes, thus causing the system 100 to realize a potential POI. In this scenario, the system 100 may then prompt the person to create a potential POI with his device, recording the location information where the device is stagnant and tagging the location information with the characteristics. In another scenario, the system 100 may automatically monitor and store device locations into a log running on the background of the device, where locations of stagnancy are automatically recorded when the device remains in the location past the time threshold.

In one embodiment, the system 100 may tag location information with device and user characteristics including location coordinates, user profile or user identification information, and/or the latest route used by the user to arrive at the location. For example, user profile or user identification information may include a picture of the user or some information that may be associated with the user. For example, user identification information may include registered information in public records that are tied to users, including license plate information, either for a vehicle the user is authorized to drive, or the user's own car. In one embodiment, the system 100 may upload and store the characteristics, thus creating a POI for the location that is saved in the system 100.

In one embodiment, the system 100 may store the route the user travelled to arrive at the saved potential POI. For example, the system 100 may backtrack to a given distance or junction, where the system 100 captures the route for the given distance or starting from the junction. In one embodiment, the system 100 may monitor and compile latest route information of the device such that system 100 may compare stored routes. In one embodiment, the system 100 may compare and then weigh certain routes depending on their frequency. For example, if a person frequently travels down Street A rather than Street B to reach a potential POI "X," the system 100 may increase the weight for the Street A route. In one embodiment, the system 100 may aggregate the weights on the routes to determine one or more preferred routes. Continuing from the previous example, system 100 may detect that Street A is more commonly used because its weight is greater than that of Street B. As such, the system 100 may define travelling down Street A as the preferred route to arrive at the potential POI "X."

In one embodiment, the system 100 may observe characteristic information tagged to the potential POI in the framework of one or more user groups. For example, the system 100 may observe the latest routes from several users, assign weights depending on the routes travelled by each of these users, and determine preferred routes based on the collective information of the several users. For example, the system 100 may define user groups based on specific location area, including city, suburb, quarter, or set radius. For example, a preferred route determined by system 100 may include the preferred route based off of weights assigned by members of a given city. For example, the system 100 may determine that a user is associated with "City A" by processing the location information of the device associated with the user.

In one embodiment, the system 100 may validate the created potential POI by directing later or other users to the stored potential POIs. For example, a user or device may collect some information to identify a potential POI. For example, a user may capture an image, presumably near the potential POI. The image may include an image of a user, user identification information (including a license plate number), a building, etc. For example, capturing the image may include a user pressing the camera button of his mobile device to capture a person, license plate, or building. The system 100 may use image recognition to identify elements in the image as matching characteristics tagged to stored potential POIs. For example, the captured image may include a person. The system 100 may recognize the person from a user profile tagged as a characteristic to various potential POIs. In one scenario, the recognized person may be the person who first stored or created the potential POI.

In another embodiment, information collection may include a search button in, for example, a social networking site (e.g. Facebook), where the search of a POI and preferred route may involve people living in the neighborhood of the current location of the user capturing the information. For example, a user may access potential POI information by capturing an image of a person or license plate and accessing user information from user groups associated with the person or license plate. For another example, a user may directly access user information from user groups via social networking sites, without capturing an image. For one scenario, a user looking for a potential coffee shop POI in a friend's neighborhood may enter the neighborhood and take a picture of a person the user presumes to be associated with the neighborhood (for instance, a shopkeeper). Alternately, the same user may instead look for the friend on a social networking site and search for the friend's contacts that are in the same neighborhood to gather information on the potential POI and/or routes for the potential POI. In using the social networking searches, the user may also directly access a user group associated with the neighborhood, without looking for contacts associated with his friend. For one embodiment, the previously discussed user groups maybe based, at least in part, on groups of contacts in social networking sites. For example, all of a user's contacts within a social networking site may be in one user group. The system 100 may also define user groups by associations created in the social networking site, for instance by school affiliation, employers, and/or location.

Then, the system 100 may identify the various POIs and routes that are stored from previous users that created or initially stored the various POIs. In one instance, system 100 may receive from the other user, a key term along with the captured image to better narrow the selection from the various POIs that may be tagged with the same user profile characteristic. In one embodiment, the system 100 may also provide POIs created by members of the same user group as the user of the captured image.

For example, person A may capture an image of a taxi driver and submit to system 100, the key words, "coffee shop." Then, system 100 may identify the potential POIs that are tagged with characteristics (including the image of the taxi driver) matching the captured image and determine the coffee shops out of the identified potential POIs. In one embodiment, the system 100 may also give access to potential POIs and information associated with POIs based on user group information. For example, if person A submits to system 100 an image of a taxi driver along with the key word, "coffee shop," and system 100 fails to detect a coffee shop among the potential POIs tagged with the taxi driver's image, system 100 may turn to a user group associated with the taxi driver. For example, system 100 may then determine one or more user groups associated with the taxi driver and extract the potential POIs that are tagged with characteristics from members or member devices of the taxi driver's user group.

In another example, a key term may include a name of a location. For example, person A may submit, "Four Saloon and Spa." In one scenario, the Four Saloon and Spa may be the name of a new business in a locality, where this new business is known by people living in its vicinity, but navigation engines have not yet been updated to include it. Then, as previously discussed, a user looking for the Four Saloon and Spa may arrive in the locality and point his camera to a person, car license plate, or building in the locality. Transmitting to system 100 his captured image of the person, license plate, or building, along with the name, "Four Saloon and Spa," may permit system 100 to find a potential POI associated with "Four Saloon and Spa." In one embodiment, the system 100 may provide the user capturing the image with information regarding the potential POI he wishes to identify, including routes to lead to the potential POI. The routes may include preferred routes of previous users the system 100 associates with the potential POI.

In one embodiment, the system 100 may calculate one or more routes to lead the user to the potential POI. These routes may or may not be based on previous or preferred routes. In one instance, the system 100 may calculate these routes by taking into account the user's current position. In a further embodiment, the system 100 may provide routes or information regarding established, known POIs, in addition to information on potential POIs. For example, a user may look for POIs known to be proximate potential POIs in order to have landmarks or signs of being very close to potential POIs.

In obtaining the potential POIs that match the submitted information and key words, the system 100 may determine one or more recommendations that may help the system 100 validate the potential POIs. For example, the system 100 may offer one or more routes to the potential POIs as the recommendations that may help validate potential POIs. For example, the system 100 may determine the contextual information of the device that captured the information. For example, the system 100 may find the location of the capturing device and find one or more routes to the potential POIs from the location of the capturing device to the potential POIs. The one or more routes may include the routes tagged to the potential POIs, including preferred routes from the user groups that the users and user groups may associate with potential POIs.

Furthermore, the system 100 may permit validation of the potential POIs by detecting when capturing devices reach the potential POIs, especially when the capturing devices arrive at the potential POIs by following one of the preferred routes. Arriving at a potential POI after following a preferred, previously saved route reinforces the legitimacy of the route and increases the likelihood that the potential POI is actually a POI. In other words, successfully directing a subsequent, capturing device to a potential POI using stored route and location information associated with the potential POI, verifies that the stored potential POI information is correct. The aggregation of users and user devices reaching saved, specified location information, may validate the location information as a reliable actual POI. For example, after providing the capturing device with a route to arrive at the potential POI, the system 100 may continue to monitor the contextual information (including location information) of the capturing device to see that the capturing device is following the route. If following the route leads the capturing device to the expected location, the system 100 may validate the potential POI.

For example with the previous scenario of searching for a coffee shop, the system 100 may provide the capturing device with a preferred route to the potential coffee shop POI based off of user group information and tagged characteristics. If the capturing device follows the preferred route and actually ends up at a coffee shop with the location information of the potential POI, the system 100 may validate the potential POI. IC on the other hand, the coffee shop is near, but not at the saved location, the system 100 may not validate the potential POI and may, instead, save a new POI as a coffee shop. Furthermore, if there is no coffee shop at all and the location is a clothing shop instead, the system 100 may also fail to validate the potential POI.

In one embodiment, POIs are stored based on validation of potential POIs reaching a given threshold. For example, the system 100 may assign values to the potential POIs as the potential POIs are validated such that values that reach a certain amount are saved more permanently as POIs. By the same token, the system 100 may discard potential POIs that do not receive sufficient validation, where the system 100 may recognize these potential POIs either as user errors, or locations that were too transient to be saved as a POI.

As shown in FIG. 1, the system 100 comprises a user equipment (UE) 101 having connectivity to a UE 101, a location module 103, a characteristic module 107, a user interface module 109, a validation platform 111, a potential point of interest database 113, a user group platform 115, and a route platform 117 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the system 100 may determine one or more potential points of interest by monitoring the duration that a device is at a particular location. As previously discussed, monitoring time in association with location information is only one exemplary way to determine one or more points of interest. In one embodiment, location module 103 may monitor the location information of at least one device to determine one or more points of interest visited by the device. For example, the location module 103 may detect when at least one UE 101 has been in one location for a given amount of time. For instance, the detection may include a time threshold where the location module 103 makes note of locations where a device has stayed past the time threshold.

In one embodiment, the location module 103 may monitor location information by automatically monitoring and storing user device locations into a global positioning system (GPS) log via a GPS device application running in the background of the device. For example, the location module 103 may react immediately when finding that the at least one device has been stagnant past a time threshold, or refer to the GPS log and react retroactively.

In one embodiment, the characteristic module 107 may tag the one or more potential points of interest with one or more characteristics of the at least one device, one or more users of the at least one device, or a combination thereof. For example, the characteristic module 107 may determine one or more location coordinates associated with the device, one or more user profiles for a user associated with the device, and/or the latest route information of the device. For the location coordinates, the characteristic module 107 may interact with the location module 103 and GPS device application to determine the coordinates. For instance the location module 103 may log the location coordinates where a device has remained past a certain time threshold and deliver the coordinates to characteristic module 107. The one or more user profiles may include information include pictures of the user, vehicle license plates associated with the user, description information regarding the user, or a combination thereof. For example, description information may include user interests, preferences, age group, etc.

Lastly, the latest route information may include the route travelled by the at least one device to reach the potential POI. For instance, the characteristic module 107 may define a given distance and/or time variable where the location module 103 and/or characteristic module 107 may trace the device route back to the distance or time variable. In one scenario, the characteristic module 107 may define a 10 km radius where the characteristic module 107 stores the route of the last 10 km travelled by the device to arrive at the potential POI.

In one embodiment, the user interface module 109 may prompt a user to store and save a potential POI or tag information to create the potential POI. For example, after detecting that the UE 101 is in a set location past the time threshold, the user interface module 109 may display a prompt for the user to save his location coordinates, some form of description of the location, other characteristics associated with himself or his device, or a combination thereof. Saving this information together may create a potential POI. For example, the user interface module 109 may ask the user to select his age range and the type of location. One such scenario may include the user interface module 109 presenting a drop-down menu where the user may select, for example, "coffee shop" and "ages 18-25", thus implying that the user is at a coffee shop frequented by students or young professionals.

In another embodiment, the user interface module 109 may also present routes for users to follow to arrive at potential POIs in order to validate the existence of the potential POI. For example, the user interface module 109 may present options of different routes for the user to select, one route, a route that recalculates according to the user's movement (or device movement associated with the user), or a combination thereof. Leading the user to a potential POI may allow system 100 to verify the accuracy of saved potential POIs.

Next, the validation platform 111 may validate one or more of the potential POI based, at least in part, on the one or more characteristic as captured by at least one other device, one or more other users of the at least one other device, or a combination thereof. For example, the validation platform 111 may receive one or more images related to a potential POI and, with image recognition technology, determine an identification of the one or more potential POI. The validation platform 111 may then direct a subsequent user to the one or more potential POI based on the identification. To direct the subsequent user to the potential POI, validation platform 111 determine and/or monitor contextual information of the subsequent device. Contextual information of the subsequent device matching that of a potential POI may imply the potential POI information is accurate. Thus, in detecting a match, the validation platform 111 may weight a potential POI to show validation.

The potential POI database 113 may store all the potential POIs. As previously discussed, the system 100 may seek to ensure that potential POIs are accurate. In one embodiment, the potential POI database 113 may store potential POIs that meet a certain weight threshold or maintain a certain weight threshold based on the weights assigned by the validation platform 111. In doing so, the potential POI database 113 may maintain a collection of potential POIs and discard inaccurate potential POIs. For example, remaining in the potential POI database 113 may be time-sensitive. For example, the potential POI database 113 may discard potential POIs that are not validated at all past one month. The system 100 may assume that if no users have re-visited a certain location in one month's time, the location must not be an actual destination or POI.

In one embodiment, the user group platform 115 may form user groups to leverage information regarding potential POIs across groups of users. For example, if one particular user lacks information regarding a potential POI, identifying the user may permit system 100 to still gather information on a potential POI by accessing one or more user groups associated with the particular user. For example, the user group platform 115 may permit groupings of potential POIs and routes to the potential POIs as travelled by members within a user group.

In grouping users, the system 100 may better offer recommendations to subsequent users for the subsequent users to validate potential POIs. For example, the system 100 may offer recommendations in the form of routes travelled by previous users to arrive at a potential POI. For example, the route platform 117 may determine preferred routes to the potential POIs.

In one embodiment, the route platform 117 may determine preferred routes by interacting with the user group platform 115. For example, the user group platform 115 may form groupings of users and devices from which the route platform 117 receives information regarding routes travelled by the users and devices, organized by group. Then, in the frameworks of the groups, the route platform 117 may determine the frequency that various routes are used to reach a particular POI and determine a most frequently used route. In one embodiment, the route platform 117 may also receive route information from various other sources to supplement determining a preferred route. In leading a subsequent user to a potential POI by way of a preferred route, the system 100 may allow the user to validate that the potential POI indeed reflects the information stored in system 100.

By way of example, the UE 101, a location module 103, a characteristic module 107, a user interface module 109, a validation platform 111, a potential point of interest database 113, a user group platform 115, and a route platform 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2A:
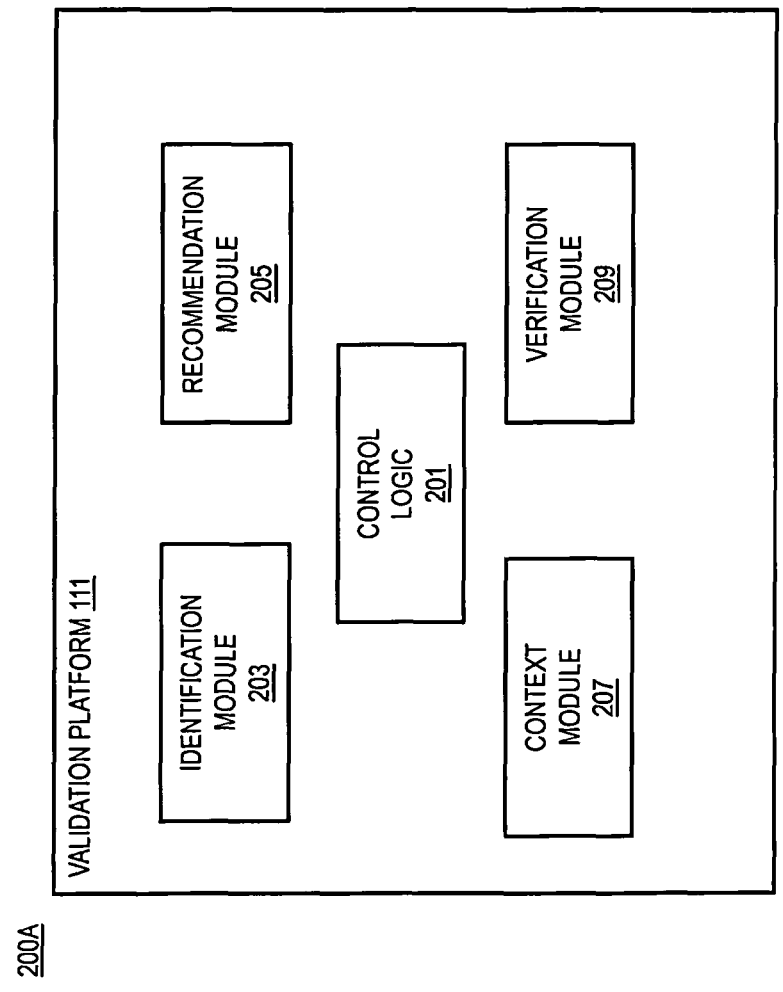
FIG. 2A is a diagram of the components of the validation platform, according to one embodiment.

FIG. 2A is a diagram of the components of the validation platform 111, according to one embodiment. By way of example, the validation platform 111 includes one or more components for providing validation of one or more potential points of interest. It is contemplated that the functions of these components may be combined in one or more components or performed by other components of equivalent functionality. In this embodiment, the validation platform 111 includes a control logic 201, identification module 203, recommendation module 205, context module 207, and verification module 209.

The control logic 201 may receive at the identification module 203, data input at a site assumed to be near one or more potential POIs. For example, the control logic 201 and identification module 203 may receive an image assumed to be near the potential POIs. For example, the identification module 203 may receive the image at least one other device, one or more other users of the at least one device, or a combination thereof. In one scenario, a user trying to find a potential POI may arrive near the potential POI, and then capture an image of his surroundings.

Based on the received image, control logic 201 and identification module 203 may determine an identification of one or more potential POIs. For example, the control logic 201 and identification module 203 may detect various elements in the image and compare it to characteristics tagged to potential POIs in the potential POI database 113. For instance, the control logic 201 and identification module 203 may determine that an element, including a person in an image, matches a user profile picture tagged to a potential POI. Alternately, the person in the image may match user identification information, including license plate information. In another instance, the control logic 201 and identification module 203 may determine that an element is a building that is a well-defined POI with known location coordinates.

Upon identifying an association between tagged characteristics and the captured image, the control logic 201 and recommendation module 205 may obtain a preferred route from the route platform 117 and create one or more recommendations. In one embodiment, the control logic 201 and recommendation module 205 may detect the contextual information of the at least one other device and determine a recommendation based, at least in part on the contextual information. For example, the control logic 201 and recommendation module 205 may determine the present location coordinates as contextual information of the at least one other device and present the preferred route based on the present location.

In another embodiment, the control logic 201 and context module 207 may determine contextual information associated with the at least one other device. For example, the control logic 201 may determine the location of the at least one other device through a monitoring of the contextual information with respect to the one or more preferred routes. For instance, the control logic 201 and context module 207 may determine from the contextual information of the at least one other device that the at least one other device is following or travelling along the one or more preferred routes. In another instance, the control logic 201 and context module 207 may determine an association between the contextual information and the one or more potential POIs associated with the one or more preferred routes. For example, a potential POI may be associated with a preferred route. The control logic 201 and context module 207 may determine and association between the contextual information of the at least one other device and the potential POI when the location information of the at least one other device corresponds to the location information of the potential POI. In other words, the control logic 201 and context module 207 may detect when the at least one other device arrives at the potential POI.

In one embodiment, the control logic 201 and verification module 209 may validate the potential POI when the control logic 201 and context module 207 detect the at least one other device's arrival at the potential POI. For example, the control logic 201 and verification module 209 may give a weight to the potential POI. As previously discussed, potential POIs in the potential POI database 113 may remain in the database contingent on the weightage given by the control logic 201 and verification module 209.

In one embodiment, the one or more recommendations may include one or more routes previously used by other devices to reach the potential POI. In one embodiment, the control logic 201 and recommendation module 205 work with the route platform 117 to determine one or more routes used by the at least one device to reach the one or more potential POIs.

Figure 2B:
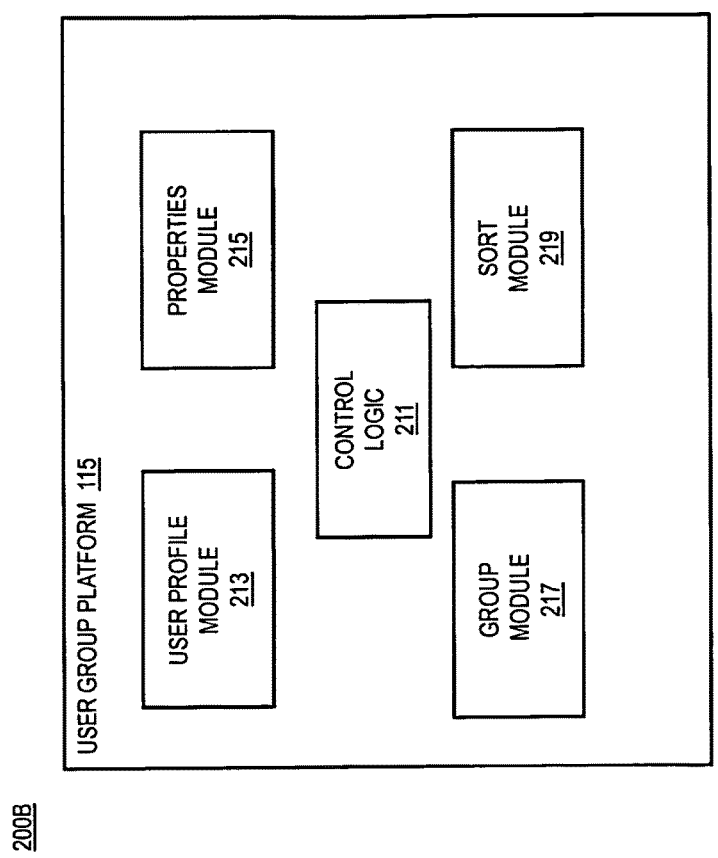
FIG. 2B is a diagram of the components of the user group platform, according to one embodiment.

FIG. 2B is a diagram of the components of the user group platform 115, according to one embodiment. By way of example, the user group platform 115 includes one or more components for creating one or more user groups. It is contemplated that the functions of these components may be combined in one or more components or performed by other components of equivalent functionality. In this embodiment, the user group platform 115 includes a control logic 211, tag module 213, properties module 215, group module 217, and sort module 219.

In one embodiment, the control logic 211 and tag module 213 may extract characteristics of the at least one device. For example, the control logic 211 and tag module 213 may interact with the characteristic modules 107 of one or more UEs 101 to store information related to the at least one device, one or more users of the at least one device, or a combination thereof. For example, within a given geographical area, the control logic 211 and tag module 213 may receive characteristics from UEs 101 associated with the geographical area. In one scenario, the control logic 211 and tag module 213 may contact the characteristic modules 107 of all the devices shown by the GPS application to be in town "X" for over the span of a month. The system 100 may take the span of a month to imply that the users or devices are residents or, at least, familiar with town "X," and thus collect the characteristics that are tagged to the devices and/or the users associated with the devices.

In one embodiment, the control logic 211 and properties module 215 aggregate the combination of the extracted characteristics and organize them to designate properties that define one or more user groups. For example, extracted characteristics may include an assortment of location information, user profile information including pictures, user identification information, route information, or a combination thereof. The control logic 211 and properties module 215 may decipher properties from the extracted characteristics. For example, extracted characteristics may show a concentration of devices as being, primarily, within a certain geographical area. The control logic 211 and properties module 215 may then designate the geographical area as "City A", such that "City A" may become a property. For another example, properties may define overlapping geographical areas, including city, suburb, quarter, or pre-set radius. Alternately, the control logic 211 and properties module 215 may detect that extracted characteristics show user profile information implying a user who is a student (versus a working professional). The control logic 211 and properties module 215 may then create the property, "student."

In one embodiment, the control logic 211 and properties module 215 may associate properties with each other. Following the previous discussion, the control logic 211 and properties module 215 may detect that many devices that have the property, "student", are also associated with the property, "City A." Then, the control logic 211 and properties module 215 may create an association between the properties, "student" and "City A."

In one embodiment, the control logic 211 and group module 217 then form groups based, at least in part, on the defined properties. For example, the groups formed by control logic 211 and group module 217 may be defined or associated with one or more properties. As previously discussed, the groups may be defined by the properties of geographical areas. In another embodiment, the control logic 211 and group module 217 may tier groups or have hierarchies of groups. For example, users and devices may be categorized in groups defined by properties ranging from specific to general, where groups with more specific properties may be nested inside general groups.

For example, the control logic 211 and group module 217 may define the groups: City A, City B, and Province C. "City A" and "City B" may be more specific groups relative to group Province C. In one instance, the control logic 211 and group module 217 may organize the groups such that "City A" and "City B" are included in the group "Province C." By extension, members of the groups, "City A" and "City B" may be members of the "Province C" group. In another embodiment, the control logic 211 and group module 217 may form associations between groups. For example, the control logic 211 and group module 217 may associate group "City A" with group "Suburb A." In doing so, even if the captured characteristic does not directly yield a matching potential POI, the system 100 may provide potential POIs and preferred routes for validation of potential POIs by accessing the potential POIs and routes of user groups related to the user group directly associated with the captured characteristic.

In one embodiment, the control logic 211 and sort module 219 may extract user profile information and sort various devices into groups, both for the at least one device and at least one other device. In one embodiment, the control logic 211 and sort module 219 also associate the at least one device and the capturing device with the properties of the groups. For example, the control logic 211 and sort module 219 may determine that, based on the location information of a device, the device should belong in a "City A" group. Then, the control logic 211 and sort module 219 may associate the device with the "City A" group. In doing so, the control logic 211 and sort module 219 may associate the properties of the "City A" group with the device. For example, the control logic 211 may define group "City A" by the properties of a geographic area and the term, "student." In associating a device with the "City A" group, the control logic 211 and sort module 219 will also associate the device with the property, "student."

Figure 2C:
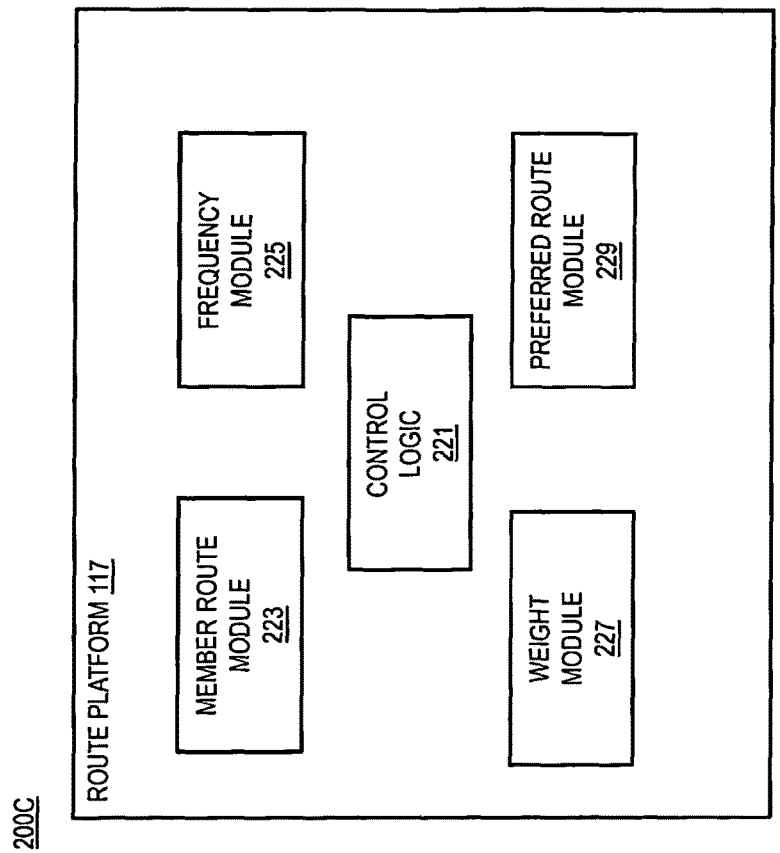
FIG. 2C is a diagram of the components of the route platform, according to one embodiment.

FIG. 2C is a diagram of the components of the route platform 117, according to one embodiment. By way of example, the route platform 117 includes one or more components for creating one or more user groups. It is contemplated that the functions of these components may be combined in one or more components or performed by other components of equivalent functionality. In this embodiment, the route platform 117 includes a control logic 221, member route module 223, frequency module 225, weight module 227, and preferred route module 229.

In one embodiment, the control logic 221 and member route module 223 receive routes associated with potential POIs. The routes may be the routes travelled by at least one device, at least one user associated with the at least one device, and members of the user groups. The control logic 221 and frequency module 225 may determine how often the routes are travelled, including various legs of the routes. For example, the control logic 221 and frequency module 225 may determine various junctions or options in routes and see where one junction is chosen over another in a route. In other words, the control logic 211 and frequency module 225 may analyze entire routes for frequency and/or segments of routes.

Then, the control logic 211 and weight module 227 may assign weights to the routes that are more frequently travelled. The control logic 211, frequency module 225, and weight module 227 may work closely together to weight the routes as they increase in frequency, or the weight module 227 may weight routes only after set frequencies have been reached. In one embodiment, the control logic 211 and preferred route module 229 may then determine one or more preferred routes based off the weights assigned to routes by the control logic 211 and weight module 227. For example, a route that is most heavily weighted may be the route most frequently travelled or most travelled by users in a given user group. The control logic 211 and preferred route module 229 may then recognize this route as the preferred route for members of the user group to use in reaching a given potential POI.

Figure 3:
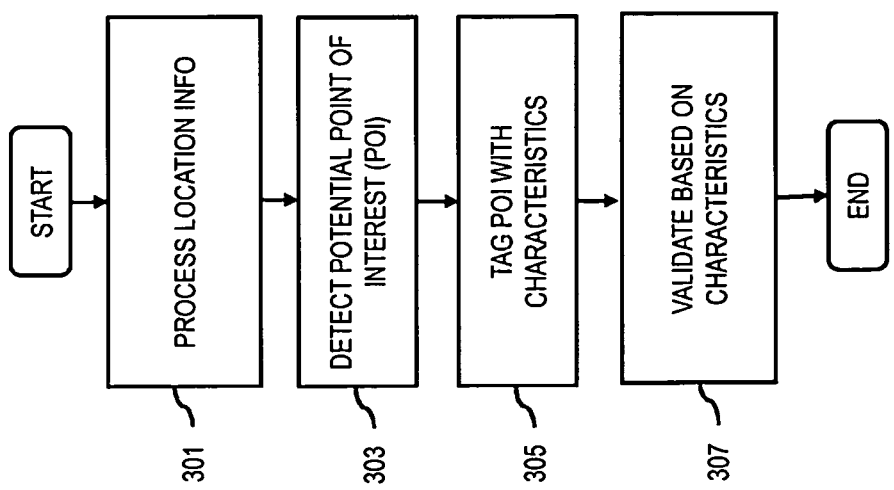
FIG. 3 is a flowchart of a process for the maintenance, validation, and search for points of interests (POIs), according to one embodiment.

FIG. 3 is a flowchart of a process for the maintenance, validation, and search for points of interests (POIs), according to one embodiment. In one embodiment, the system 100 performs the process 300. In step 301, according to one embodiment, the control logic 201 and identification module 203 may process and/or facilitate a processing of location information associated with at least one device to determine one or more potential points of interest visited by the at least one device. According to another embodiment, the control logic 201 and identification module 203 may recognize the device remained at the same geographic location for an extended period of time. According to one embodiment, the control logic 201 and identification module 203 may send a message through the communication network 105 to the user equipment 101 to prompt the user to validate and identify the location as a POI. In step 303, according to one embodiment, if the user sends confirmation that the geographic location is a POI, the control logic 201 and the verification module 209 may verify the geographic location as a valid POI. For example, according to this embodiment, if a user is at an ice cream shop for a predetermined period of time, user device will communicate this location's coordinates to the control logic 201 and the control logic will respond by sending a request for the user to validate that the location is a POI.

In step 305, according to one embodiment, the control logic 201 may cause, at least in part, a tagging of the one or more potential points of interest with one or more characteristics of the at least one device, one or more users of the at least one device, or a combination thereof. According to one embodiment, the control logic 201 may create this tag wherein the one or more characteristics include user profile information, user identification information, or a combination thereof. According to one embodiment, the control logic 211 may also associate the most recent route taken by the device and/or user and assign a weight to this route. According to another embodiment, the control logic 201 and verification module 209 may ask the user to submit a picture in order to validate the platform. The control logic 201 may create an association between the submitted picture and the POI while the control logic 211 may associate the most recent route taken by the device and/or user and assign a weight to this route. For example, when the user in the ice cream shop example above confirms that the user is at a POI, the user interface module 109 may prompt the user to submit pictures and keywords to associate with this POI. Additionally, the control logic 201 may tag the user's route traveled to the location and the user's profile to be associated with the POI.

According to another embodiment, the control logic 201 may associate a user group to the POI. In step 307, according to one embodiment, the control logic and verification module may cause, at least in part, a validation of the one or more potential points of interest based, at least in part, on the one or more characteristics as captured by at least one other device, one or more other users of the at least one other device, or a combination thereof. According to one embodiment, the control logic 201 may validate the POI based on the characteristic information provided by a device user. For example, continuing with the ice cream shop example above, the control logic 201 may add user who confirms the ice cream shop's geographic coordinates as a POI to a user group of ice cream shop visitors. The control logic 201 may then add this group as a tag association to the POI along with the POI's other characteristics added by the user (including but not limited to keyword, pictures, routes, etc.).

Figure 4:
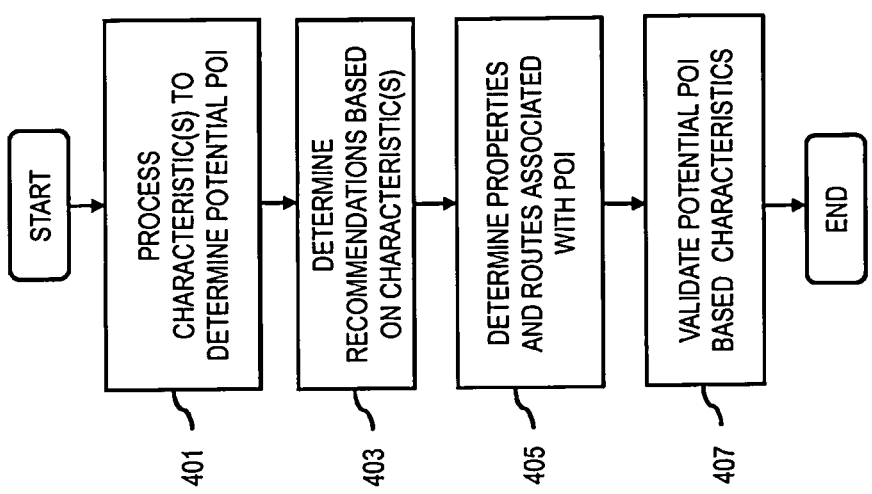
FIG. 4 is a flowchart of a process for using characteristics of a potential POI to validate a potential POI, according to one embodiment.

FIG. 4 is a flowchart of a process for using characteristics of a potential POI to validate a potential POI, according to various embodiments. In one embodiment, the system 100 performs the process 400. In step 401, a user may capture information associated with a potential POI to later validate the POI. For instance, a user may take a picture in the vicinity of a POI and send that image through the of the communication network 105 to the control logic 201. In step 403, the control logic 201 may process and/or facilitate a processing of the one or more characteristics to determine one or more recommendations regarding the one or more potential points of interest, wherein the validation of the one or more potential points if interest is based, at least in part, on the one or more recommendations. According to one embodiment, the control logic 201 may identify a matching image and/or element in the image. The control logic 201 may search the user profiles of nearby POI's for the match. If the control logic 201 finds one or more POIs with a match of the image submitted by the user, the control logic 201 may list the local POIs to the user. For example, in the ice cream shop example above, if a second user takes a picture of the original user (the user who created the POI), and submits the first user's picture to the control logic 201, the control logic 201 may identify the POI created by the first user. The control logic 201 may search and identify the first user's profile picture and notice that the ice cream shop POI is associated with this first user. The control logic 201 may then communicate the POI to the second user who captured the image of the first user to identify a local POI. According to another embodiment, after the user receives one or more recommendations based on the submitted image, the user may then shoot and submit an image of an additional person to the control logic 201 for a shorter and more narrowly defined list of potential POIs. According to another embodiment, the user may submit two or more pictures at the same time of characteristics of a POI for the control logic 211 to search validated POIs. According to another embodiment, the user may submit a picture or pictures of characteristics with one or more keywords to search nearby POIs.

According to one embodiment, the control logic 201 may process and/or facilitate a processing of the one or more characteristics to determine one or more recommendations regarding the one or more potential points of interest (steps 405-407). According to one embodiment, the control logic 201 may add or use characteristic information (pictures, routes, etc.) and keyword(s) provided by a user to update or validate a POI. For instance, the control logic 201 may process characteristics to find preferred routes that a subsequent user may then follow to validate a potential POI. According to another embodiment, the control logic 201 may not create a new POI until it has received a critical mass of characteristics by a critical mass of users in order to ensure accuracy. For example, instead of a single user confirming a POI to validate the POI, the control logic 201 may require a predetermined number of users over a set period of time (for example, the location must have at least 15 users confirm that it is a POI within 30 days) in order for the control logic 201 to validate that the geographic location is a POI. According to another embodiment, there is no time limit required for the control logic 201 to validate a geographic location as a POI. For example, whenever the geographic location receives 15 user confirmations, regardless of the time passed between the first and the fifteenth user.

Figure 5:
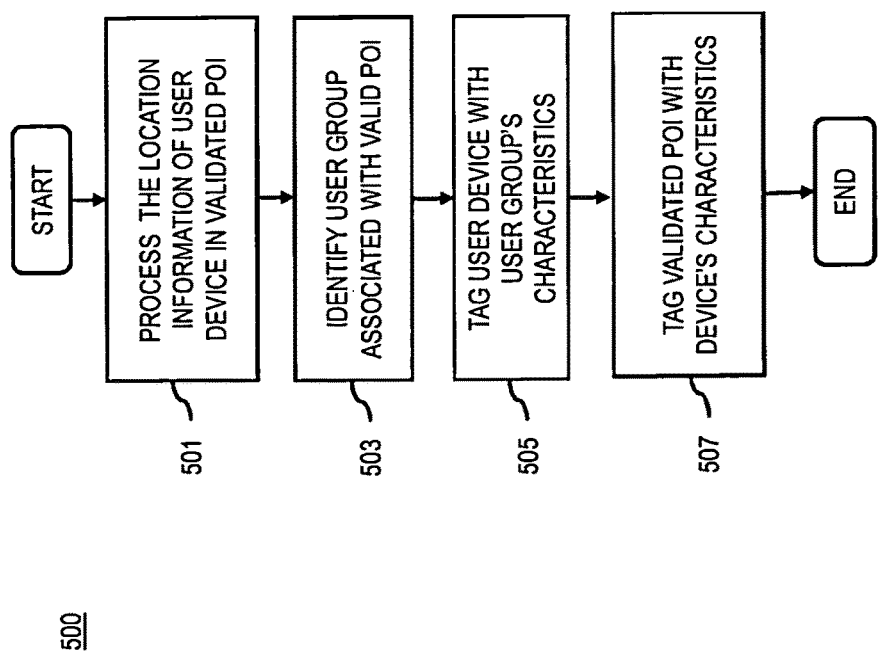
FIG. 5 is a flowchart of a process for allowing a user's location information to create user groups to determine group characteristics to validate POIs, according to one embodiment.

FIG. 5 is a flowchart of a process for allowing a user's location information to create user groups to determine group characteristics to validate POIs, according to various embodiments. In one embodiment, the system 100 performs the process 500. In step 501, according to one embodiment, the control logic 201 may process and/or facilitate a processing of the location information to determine one or more user groups associated with the at least one device. According to embodiment, once the control logic 201 has ascertained that the user is at a potential POI, the control logic 211 may begin its process of group association among the user, his current location, and the user groups associated with the user's current location. In step 503, according to one embodiment, the control logic 211 may cause, at least in part, an association between the at least one device and one or more properties associated with the one or more user groups. According to one embodiment, the control logic 211 may seek and identify user group(s) associated with the user's potential POI. According to one embodiment, the user group(s) and or user profiles may be linked with various social networking websites or groups. According to another embodiment, these links among various social networking websites or groups may create an automatic share of the user's potential POI, if the preference is set up by the user. According to another embodiment, the user interface module 109 will display an option of sharing the user's current location at POI. According to another embodiment, the user may have an option of publicly sharing the group that the user is has been associated with on the user's social networks. Once shared, viewers of the group may view shared potential POI, including its location, preferred routes, and user group member profiles. According to another embodiment, where users may browse the other members of the group, the users may create sub-groups within the groups. These subgroups may be shared on social networking websites as well.

In step 505, according to one embodiment, the control logic 211 may cause the association between the at least one device and one or more properties associated with the one or more user groups wherein the one or more properties are based, at least in part, on a combination of one or more characteristics associated with one or more members of the one or more user groups. According to one embodiment, the control logic 211 may tag a device/UE 101 with the characteristics of a user group associated with a potential POI created by the device/UE 101. In step 507, according to one embodiment, control logic 211 may tag the user group associated with the user's potential POI with the characteristics associated with the user device at the current POI. According to one embodiment, the control logic 211 may determine, at least in part, the one or more recommendations based, at least in part, on the one or more properties associated with the one or more user groups. For example, once the user is associated with a user group associated with a certain potential POI, the control logic 211 may store this association and use it in the user or user device's future searches for POIs. Furthermore, recommendations may be based on these user group tag associations.

Figure 6:
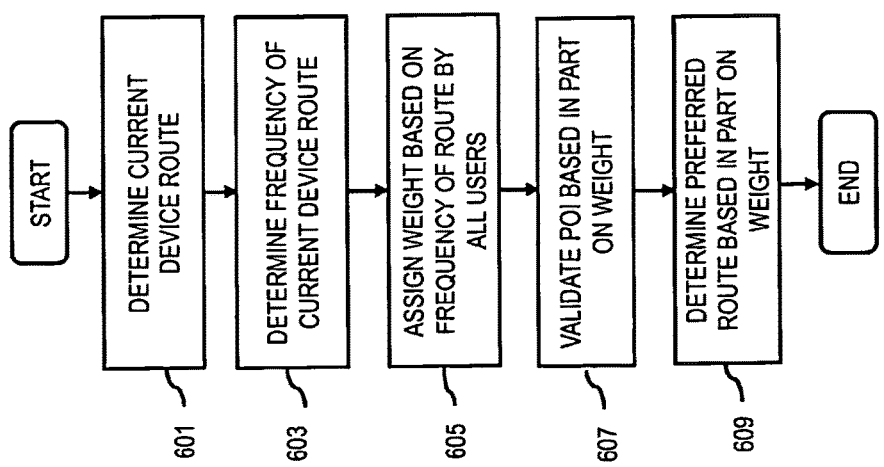
FIG. 6 is a flowchart of a process for determining and weighting routes based at least in part on user frequency to identify preferred routes to validated POIs, according to one embodiment.

FIG. 6 is a flowchart of a process for determining and weighting routes based, at least in part, on user frequency to identify preferred routes to validated POIs, according to various embodiments. In one embodiment, the system 200B performs the process 600. In step 601, according to one embodiment, after the user has traveled to within close proximity to the POI, the control logic 211 may aid the user to reach the POI. The control logic 211 may determine the current route of a UE 101. In step 603, according to one embodiment, the control logic 211 may determine a frequency that the one or more members of the one or more user groups travel the one or more routes. According to one embodiment, the control logic 211 may determine the frequency of a UE 101's current route.

In step 605, according to one embodiment, the control logic 211 may cause, at least in part, a weighting of the one or more routes based, at least in part, on the frequency. According to one embodiment, the control logic 211 may assign weight based on the frequency of the route by all users. In step 607, according to one embodiment, the control logic 211 may cause this weighting wherein the validation of the one or more potential points of interest is based, at least in part, on the weighting. According to one embodiment, the control logic 211 may communicate the weight of this route to the control logic 201 in order to validate the POI. In step 609, according to one embodiment, the control logic 211 may determine one or more preferred routes based, at least in part, on the weighting. According to one embodiment, the control logic 211 and the preferred route module 229 may use the weights of different routes to the same POI to identify preferred route, based at least partially on the assigned weight of the associated route. According to one embodiment, the control logic 211 and the weight module 227 may consider a certain user traveling the route. For example, if user A travels the same route ten times, the aggregate weight of those travels may be less than that of ten different users who are traveling the same route ten times. According to another embodiment, the control logic 211 may not consider the user when determining the weight assignment of routes.

According to one embodiment, the control logic 211 may use the current route traveled by the UE 101 to help a user locate and therefore validate a POI. For example, the control logic 211 may make recommendations wherein the one or more recommendations include one or more routes used by the at least one device to reach the one or more potential points of interest. In this embodiment, the control logic 211 may compare a UE 101's current route with similarly traveled routes in the route platform 117 to determine if the current route of the user is comparable to saved preferred routes of any of the nearly POI's. If the control logic 211 find a match between preferred routes and the current route of a UE 101, the user interface module 109 may display the results on the UE 101. If the user selects one or more of these suggested potential POI's, then the control logic 211 may display on the UE 101, remaining directions to the user's selected POI. For example, if there is a third user who happens to be looking for an ice cream POI and has traveled eighty to ninety percent of the route traveled by the first and second users to visit the ice cream shop, this third user may upload the third user's current route to control logic 211 so that the system 100 may help this third user determine the remaining route to the ice cream POI. Upon receiving the third user's route, the control logic 211 may display to the third user a list of POIs which have similar routes, one of which would be the ice cream POI, which was determined by the third user's current route and geographic location. In another embodiment, for additional accuracy, this third user may also include keywords in his search, like "ice cream," in addition to his current route and location for more targeted search results.

Figure 7:
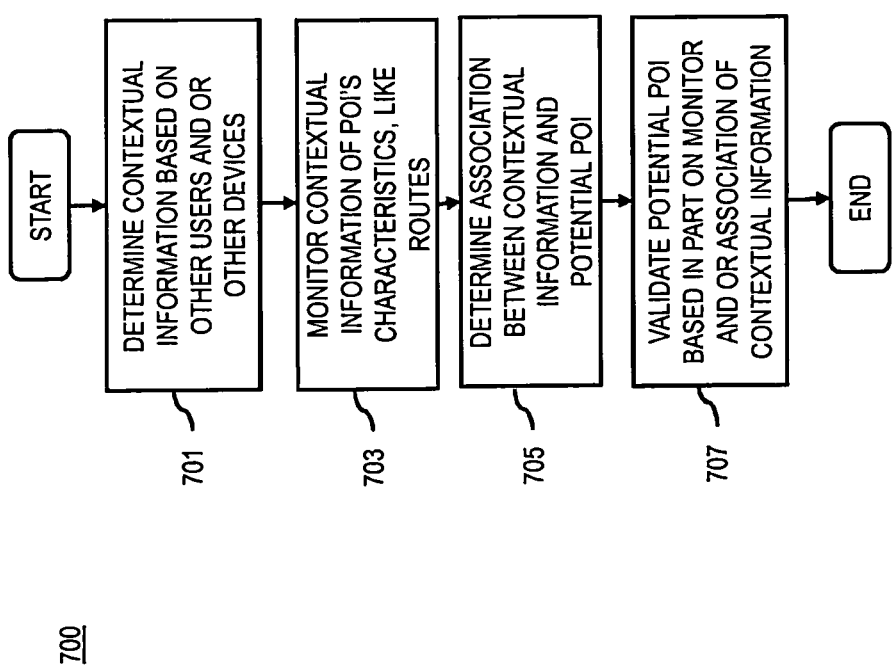
FIG. 7 is a flowchart of a process for determining and monitoring contextual information associated with a POI to validate and monitor POI, according to one embodiment.

FIG. 7 is a flowchart of a process for determining and monitoring contextual information associated with a POI to validate and monitor POI, according to various embodiments. In one embodiment, the system 200A performs the process 700. In step 701, according to one embodiment, the control logic 201 may determine contextual information associated with the at least one other device, the one or more users of the at least one other device, or a combination thereof. According to one embodiment, after a user has initially validated a POI, control logic 201 may utilize additional visits to the POI by additional users to keep the various tags associated with a POI updated. For example, an initial user visits a POI and tags the POI as an ice cream establishment, either by pictures and or keywords. Three months later, control logic 201 may receive twenty additional users tagging that same POI as an ice cream establishment.

In step 703, according to one embodiment, the control logic 201 and the context module 207 may cause, at least in part, a monitoring of the contextual information with respect to the one or more preferred routes. In step 705, the control logic 201 may determine an association between the contextual information and the one or more potential points of interest associated with the one or more preferred routes. According to one embodiment, after a certain route has established a critical mass in weight and or frequency to be deemed a preferred route by the control logic 211, the association with this preferred route is created in the POI. If, for example, an additional route is utilized more and more by users, this may trigger the control logic 201 to update that each of the routes are used roughly fifty percent of the time by visitors, causing the control logic 201 to associate both of these routes with the POI. In another example, if the second preferred route completely replaces the previous preferred route, perhaps due to either temporary construction or a permanent road block, the control logic 201 may update the preferred route module to reflect the changes in the contextual information. If, in the road construction example, the previous preferred route is once again available to users due to road construction completion and a re-opened road, the control logic 201 may begin to receive routes utilizing the previous preferred route and if this previous preferred route is used more then or as much as the current preferred route, it may be re-associated as a preferred route once again for the POI.

In step 707, according to one embodiment, the control logic 201 and the context module 207 may make this determination wherein the validation of the one or more potential points of interest is based, at least in part, on the monitoring of the contextual information with respect to the one or more preferred routes. For example, according to one embodiment, in the ice cream POI example above, if the users begin to tag "coffee" with keywords or pictures, the control logic 201 may create an additional tag association for the POI with "coffee" in addition to "ice cream," if these tags are regularly created about equally (or another predetermined percentage) among the users. According to another embodiment, if the "coffee" tag association begins to replace the "ice cream" tag association such that the proportions are closer to ninety to one hundred percent (or other pre-determined percentage) coffee tag associations, the control logic 201 will not only add the "coffee" tag association but may also drop the "ice cream" tag association from the POI. According to another embodiment, if the control logic 201 stop receiving tags of any sort from the geographic coordinates which once represented the ice cream tagged POI, then the control logic 201 may invalidate the existence of the POI altogether.

According to another embodiment, if there is an additional POI with a "John's Toy Store" tag and the location coordinates that once represented the ice cream tagged POI is eventually replaced by the "John's Toy Store" tag, then the control logic 201 may update the POI that was once John's Toy Store to reflect that that POI has expanded its geographic coordinates to encompass what was one the ice cream POI. According to another embodiment, if the POI is a franchise with several locations, the control logic 201 and the context module 207 may create a tag association with the different locations of the franchise. According to another embodiment, if the business is smaller, not quite a franchise, but a small number (less than five) stores with a common owner, the owner of the stores or users of the stores may tag the additional locations of the similar businesses. According to another embodiment, the cross-tagging of additional locations of franchises or small business may be added into the user groups that are associated with the various locations of these franchises or small businesses.

Figure 8A:
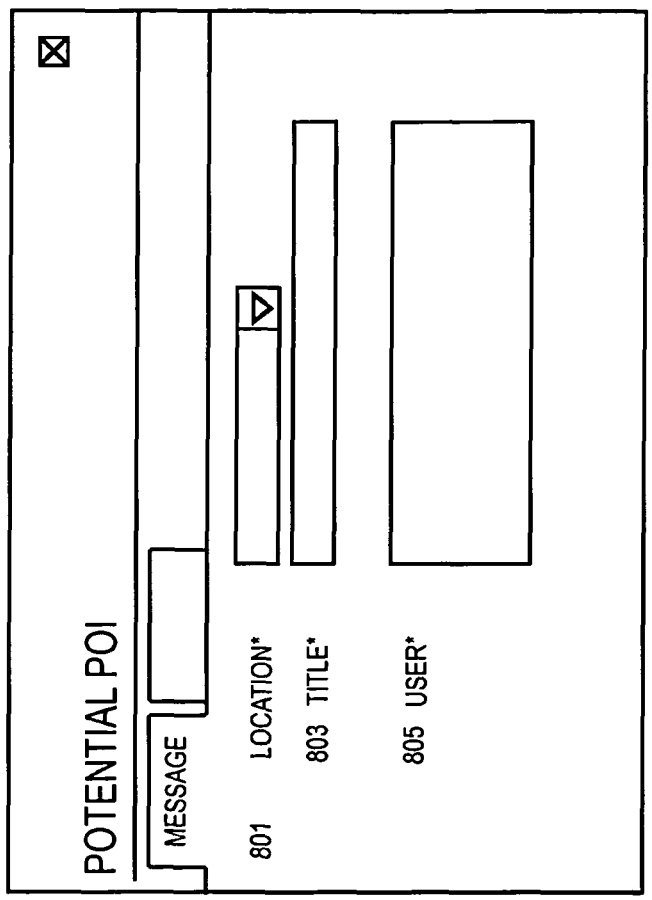

FIGS. 8A-8G are diagrams of user interfaces utilized in the processes of FIG. 3-7, according to various embodiments. FIG. 8A shows user interface 800A as where the system 100 may prompt a user to save a potential POI upon detecting that the user and/or user device has remained in a given location past a time threshold. For example, the user interface module 109 may render a location entry 801. In one scenario, a GPS application may automatically populate the location entry 801. The user interface module 109 may also prompt a user to enter a title 803 for the potential POI, for example, "bookstore" or "University Bookstore." In one embodiment, the user interface 800A may also include user descriptor 805 for the user to enter characteristics to tag to the potential POI. In one embodiment, the system 100 may automatically tag the potential POI with characteristics of a device or user of the device, but the user interface 800A may still permit the user to supplement the tags with user descriptor 805. For example, the user descriptor 805 may prompt users to enter key words associated with the potential POI.

FIG. 8B shows one embodiment, user interfaces 800B, where the system 100 may capture information to determine a potential POI and route to the potential POI. For example, a user may enter locality 807 looking for a potential POI. Locality 807 may contain building 809, which the user knows to be proximate the potential POI the user has in mind. To find and validate the potential POI, the user may arrive in locality 807 and press a camera button 811 to capture an image of building 809. The user interface 800B portrays the user capturing an image of building 809 using the camera button 811. In capturing and submitting this image to system 100, the system 100 may return potential POIs associated with the building 809, as given, at least in part, by characteristics associated with building 809 and the potential POI.

FIG. 8C shows one embodiment, user interfaces 800B, where the system 100 may process captured information to determine a potential POI and route to the potential POI. For example, after receiving a captured image, the validation 111 may prompt the user interface module 109 to display a screen showing a navigation processing 813. Then, the validation platform 111 and route platform 117 may cause user interface module 109 to display route 815 for the user to follow and possibly arrive at the potential POI associated with the characteristics of the captured image.

Figure 8D:
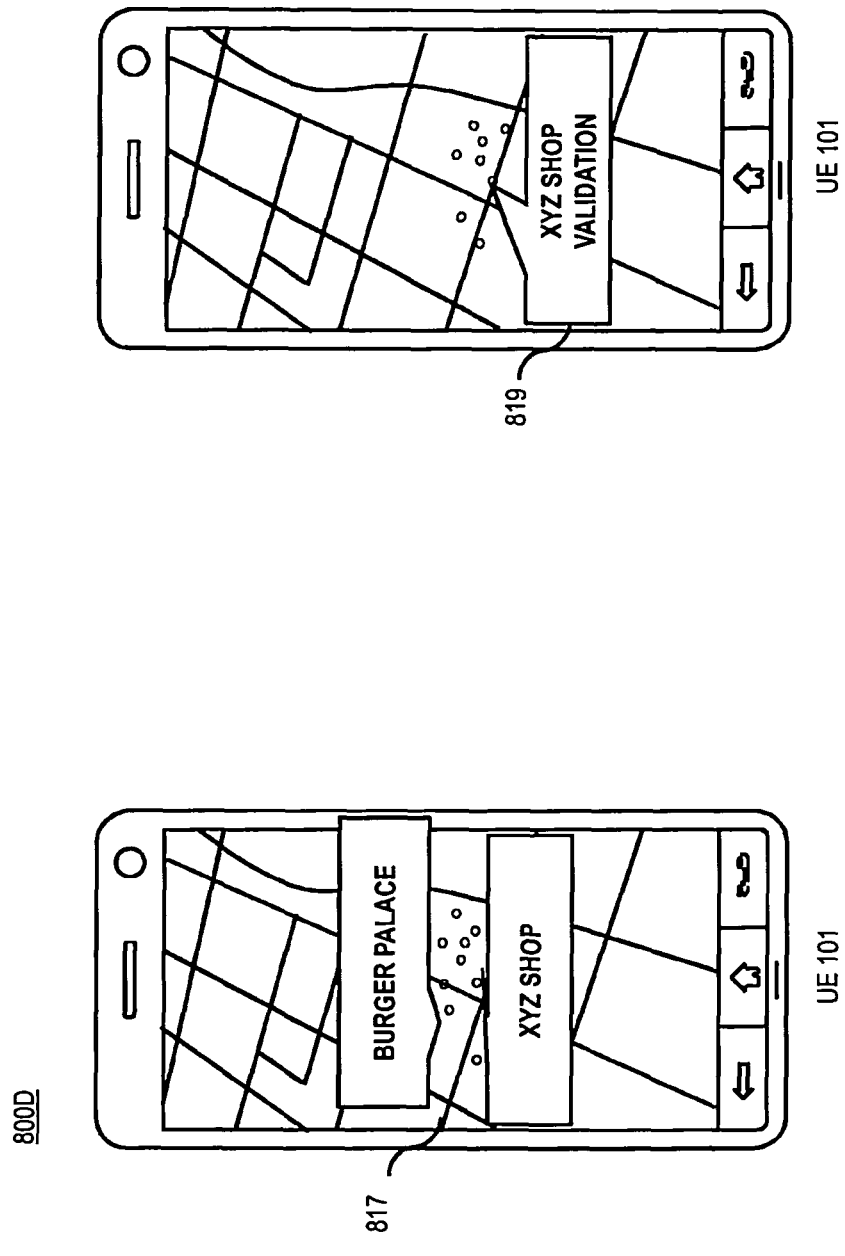

FIG. 8D shows user interfaces 800D where a user interface module 109 may display potential POIs in proximity to one another. The user interface module 109 may display not only the route, but potential POIs 817 in the vicinity of a destination potential POI, for instance, "XYZ Shop." In doing so the user may optionally help to validate additional nearby potential POIs. In one embodiment, the validation platform 111 may determine that a user has followed a preferred route given by the system 100 and, in fact, reached a potential POI. Then, the user interface module 109 may display window 819 showing validation. In another embodiment, the user interface module 109 may display an alternate window if the potential POI is inaccurate, or the user interface module 109 may display a variation of user interface 800A, prompting the user to create a new potential POI entry.

The processes described herein for validating potential points of interest using device and user characteristics may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8E:
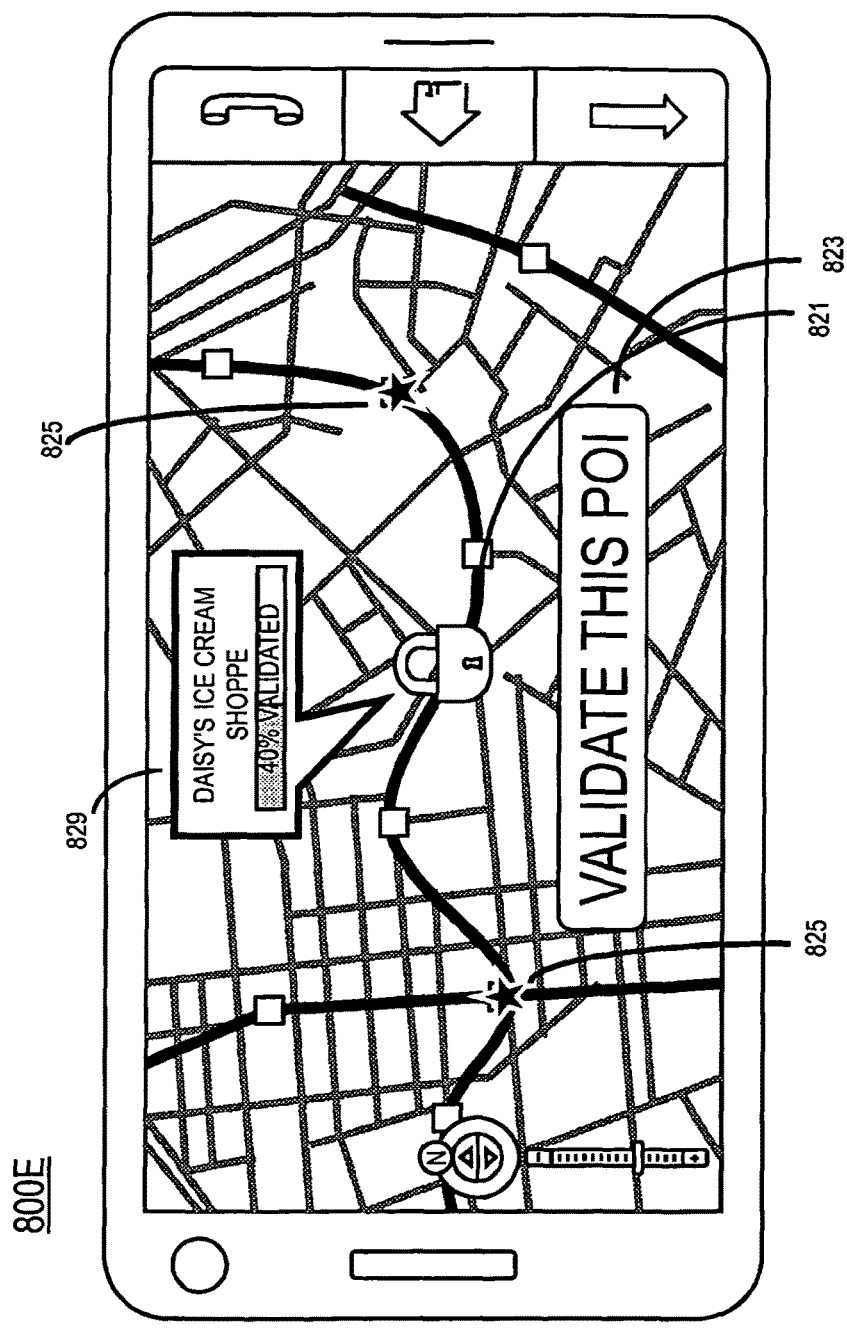

FIG. 8E shows user interface 800E as where the system 100 may aggregate users and user devices to turn a potential POI into a POI after a critical mass of validation by users and user devices have been attained by the system 100. For example, when the UE 101 is oriented horizontally, the user interface module 109 may display a map of the surrounding area with the potential POI 821 in the center of the map with an image of a lock at the geographic location of the potential POI. In this example, the lock image may denote a potential POI 821. Information about the progress of validating this POI may be displayed in information window 829, containing a description, including the name of the business and the percent progress of the validation of that potential POI 821. For example, if the critical mass for a valid POI is ten validations in thirty days, and four validations have already been registered in system 100, the progress bar in information window 829 may show that this location has been 40% validated. Validation button 823 may appear below the potential POI 821 should the user wish to validate this potential POI. Stars 825 may denote POIs saved to the navigation database.

Figure 8F:
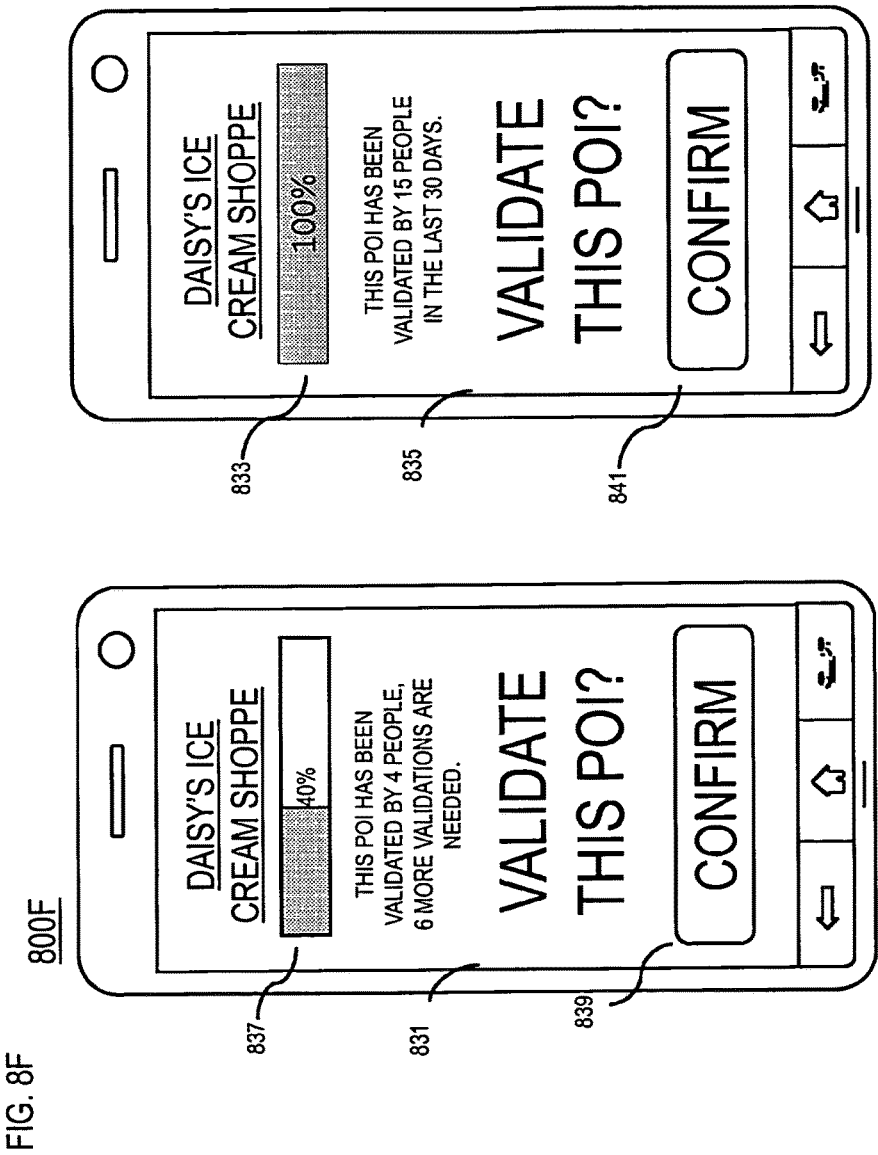

FIG. 8F shows user interface 800F when the user orients the UE 101 vertically, in one embodiment. User interface module 109 may display the progress bar 837 with text beneath providing the number of validations thus far and the number of validations still needed for the potential POI to become a valid POI. The validate POI prompt 831 may appear below the validation progress bar 837. Confirm validation button 839 be included below the validate POI prompt 831. In the case that the UE 101 is at a location which has reached a critical mass for validation, the progress bar 833 may display one hundred percent progress with text beneath showing the number of validations the location has received within the designated time period used in the critical mass definition for the location. Users will still be prompted to contribute to the validation process for this POI with the validation prompt 835 and the user may confirm validation of the POI by tapping on the confirm button 841.

Figure 8G:
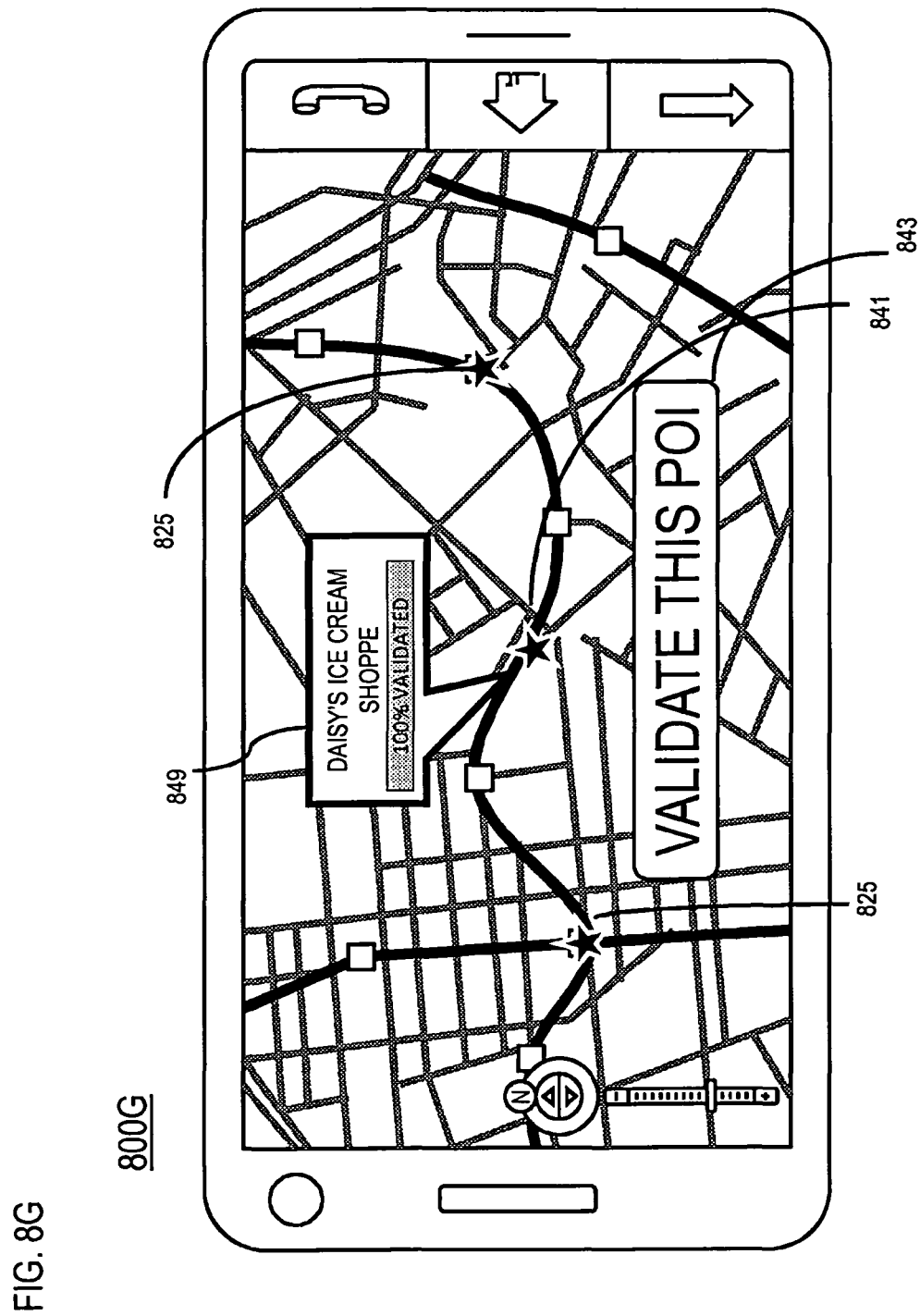

FIG. 8G shows user interface 800G when the UE 101 is oriented horizontally at a validated POI in one embodiment. User interface 800G may display a map of the surrounding area, featuring the validated POI in the center of the map in the shape of a star 841, as previously mentioned. Information window 849 may display the POI's name and the progress bar will show one hundred progress completion. The user interface 800G may allow the user to validate the current POI by tapping on the validation button 843. Stars 825 may denote POIs that are already validated.

Figure 9:
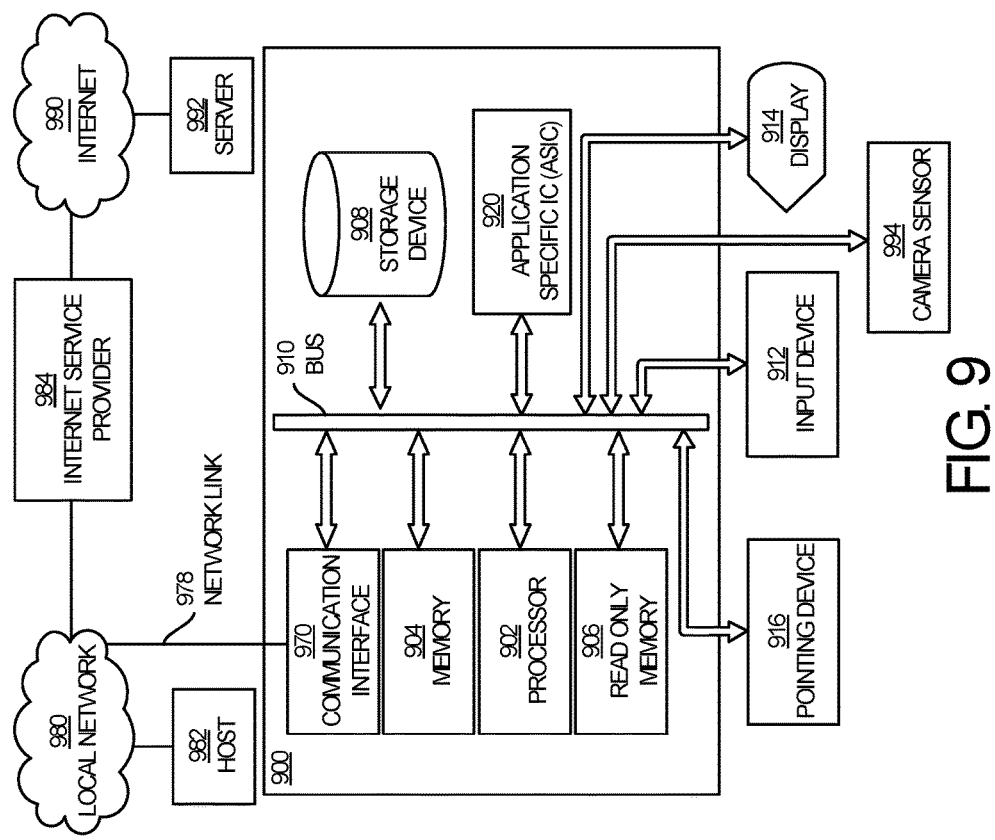
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to validate potential points of interest using device and user characteristics as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of validating potential points of interest using device and user characteristics.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to validating potential points of interest using device and user characteristics. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 900 also includes a memory 904 coupled to bus 910. The memory 904, such as a random access memory (RAM) or any other dynamic storage device, stores information including processor instructions for validating potential points of interest using device and user characteristics. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for validating potential points of interest using device and user characteristics, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors 994 for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 may be omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for validating potential points of interest using device and user characteristics to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

Figure 10:
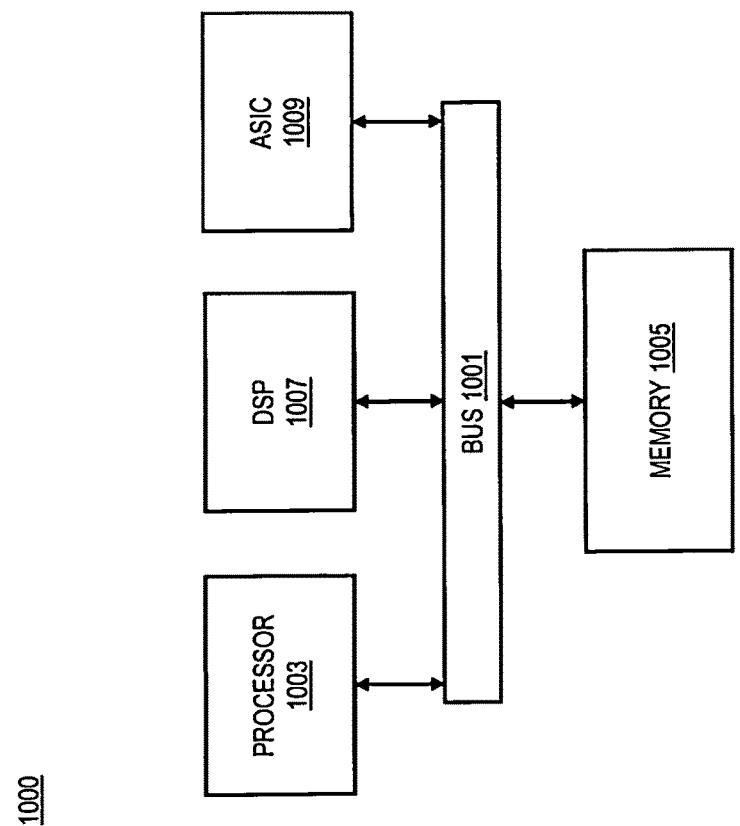
FIG. 10 is a diagram of a chip set that can be used to implement an embodiment of the invention.

FIG. 10 illustrates a chip set or chip 1000 upon which an embodiment of the invention may be implemented. Chip set 1000 is programmed to validate potential points of interest using device and user characteristics as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of validating potential points of interest using device and user characteristics.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to validate potential points of interest using device and user characteristics. The memory 1005 also stores the data associated with or generated by the execution of the inventive steps.

Figure 11:
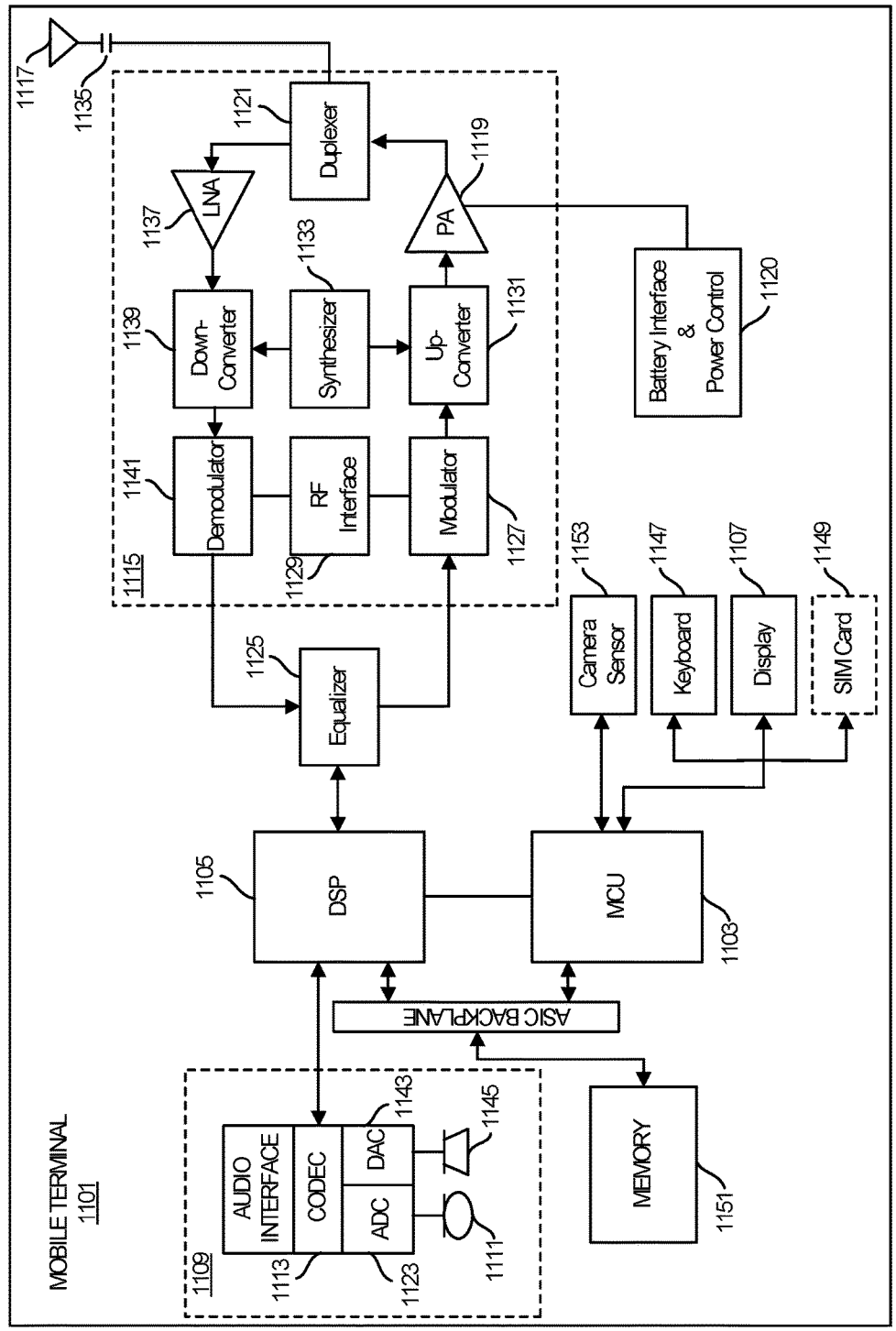
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of validating potential points of interest using device and user characteristics. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of validating potential points of interest using device and user characteristics. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to validate potential points of interest using device and user characteristics. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Further, one or more camera sensors 1153 may be incorporated onto the mobile station 1101 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

The invention claimed is:

1. A method comprising:
   obtaining, by a server and via at least one wireless link, location information associated with a first mobile device and a second mobile device to determine one or more potential points of interest visited by the first mobile device and the second mobile device, the one or more potential points of interest located at discrete geographical locations;
   obtaining, by the server and from a first sensor of the first mobile device via the at least one wireless link, first sensed data associated with one or more conditions of an area in which the first mobile device is situated, the area being at the one or more potential points of interest, the first sensed data being different from location information;
   obtaining, by the server and from a second sensor of the second mobile device via the at least one wireless link, second sensed data associated with the area in which the second mobile device is situated at the one or more potential points of interest, the second sensed data being different from location information;
   tagging, by the server, the one or more potential points of interest with an indication of the first sensed data associated with the area at the one or more potential points of interest and with at least one characteristic of a first user of the first mobile device;
   tagging, by the server, the one or more potential points of interest with a second indication of the second sensed data associated with the area at the one or more potential points of interest and with at least one characteristic of a second user of the second mobile device;
   validating, by the server, the one or more potential points of interest, the validating based on at least a portion of the first sensed data matching at least a portion of the second sensed data and at least one characteristic of the second user of the second mobile device matching at least one characteristic of the first user; and
   sending, by the server via a wireless network to the first mobile device, an indication of the validated one or more potential points of interest to enable display of the indication on the first mobile device, wherein the indication is generated by the server.

2. The method of claim 1 further comprising:
   processing one or more of the at least one characteristic of the first user and the at least one characteristic of the second user to determine one or more recommendations regarding the one or more potential points of interest,
   wherein the validating the one or more potential points of interest is based at least on the one or more recommendations, and wherein the first sensor and the second sensor each comprise a camera.

3. The method of claim 2, wherein the one or more recommendations include one or more routes used by the first mobile device to reach the one or more potential points of interest.

4. The method of claim 3 further comprising:
   monitoring a frequency that one or more members of one or more user groups travel the one or more routes; and
   determining a weighting of the one or more routes based at least on the frequency, wherein the validating the one or more potential points of interest is based at least on the weighting.

5. The method of claim 3 further comprising:
   determining one or more preferred routes based at least on a weighting of the one or more routes.

6. The method of claim 3 further comprising:
   obtaining contextual information associated with the at least one other mobile device and/or the one or more users of the at least one other mobile device; and
   monitoring the contextual information with respect to one or more preferred routes,
   wherein the validating the one or more potential points of interest is based at least on the monitoring of the contextual information with respect to the one or more preferred routes.

7. The method of claim 6 further comprising:
   determining an association between the contextual information and the one or more potential points of interest associated with the one or more preferred routes,
   wherein the validating the one or more potential points of interest is based at least on the association between the contextual information and the one or more potential points of interest associated with the one or more preferred routes.

8. The method claim 1 further comprising:
   determining, based on the location information, one or more user groups associated with the first mobile device, individual user groups of the one or more user groups consisting of a plurality of users having at least one common characteristic; and
   determining an association between the first mobile device and one or more properties associated with the one or more user groups, wherein the one or more properties are based at least on a combination of one or more characteristics associated with one or more members of the one or more user groups.

9. The method claim 1 further comprising:
determining one or more recommendations based at least on one or more properties associated with one or more user groups.

10. The method of claim 1, wherein the one or more characteristics include user profile information, user identification information, or a combination thereof.

11. The method of claim 1, wherein the first sensed data associated with the first mobile device includes an indication of an amount of time that the first mobile device has been located at the potential point of interest.

12. The method of claim 1, wherein the first sensor is a camera and the first sensed data associated with the first mobile device includes image data of the area at the one or more potential points of interest.

13. An apparatus comprising:
at least one processor; and
at least one memory including computer program code for one or more programs, the at least one memory and the computer program code configured to, with the at least one processor, cause the apparatus to perform at least the following:
obtain, via at least one wireless link, location information associated with a first device to determine one or more potential points of interest visited by the first device, the one or more potential points of interest located at discrete geographical locations;
obtain, from a first sensor of the first device via the at least one wireless link, a first sensed data associated with an area in which the first device is situated, the area being at the one or more potential points of interest, the first sensed data being different from location information;
obtain, from a second sensor of a second device via the at least one wireless link, second sensed data associated with the area in which the second device is situated at the one or more potential points of interest, the second sensed data being different from location information;
tag the one or more potential points of interest with an indication of the first sensed data associated with the area at the one or more potential points of interest and with at least one characteristic of a first user of the first device;
tag the one or more potential points of interest with a second indication of the second sensed data associated with the area at the one or more potential points of interest and with at least one characteristic of a second user of the second device;
validate the one or more potential points of interest, the validating based on at least a portion of the first sensed data matching at least a portion of the second sensed data and at least one characteristic of the first user associated with the first device matching at least one characteristic of the second user, different from the first user, associated with the second device; and
send, via a wireless network to the first device, an indication of the one or more validated potential points of interest to enable display of the indication on the first device, wherein the indication is generated by the apparatus.

14. The apparatus of claim 13, wherein the apparatus is at least further caused to at least:
process and/or facilitate a processing of one or more of the at least one characteristic of the first user and the at least one characteristic of the second user to determine one or more recommendations regarding the one or more potential points of interest,
wherein the validation of the one or more potential points of interest is based at least on the one or more recommendations, and wherein the first sensor and the second sensor each comprise a camera.

15. The apparatus of claim 14, wherein the apparatus is at least further caused to determine the one or more recommendations based at least on one or more properties associated with one or more user groups.

16. The apparatus of claim 14, wherein the one or more recommendations include one or more routes traveled by the first device to reach the one or more potential points of interest.

17. The apparatus of claim 16, wherein the apparatus is at least further caused to at least:
determine a frequency that one or more members of one or more user groups travel the one or more routes; and
determine at least a weighting of the one or more routes based at least on the frequency,
wherein the validating the one or more potential points of interest is based at least on the weighting.

18. The apparatus of claim 17, wherein the apparatus is at least further caused to at least:
determine one or more preferred routes based at least on the weighting.

19. The apparatus of claim 18, wherein the apparatus is at least further caused to at least:
determine contextual information associated with at least the second device and/or the second user; and
monitor the contextual information with respect to the one or more preferred routes,
wherein the validating the one or more potential points of interest is based at least on the monitoring of the contextual information with respect to the one or more preferred routes.

20. The apparatus of claim 19, wherein the apparatus is at least further caused to at least:
determine an association between the contextual information and the one or more potential points of interest associated with the one or more preferred routes,
wherein the validating the one or more potential points of interest is based at least on the association between the contextual information and the one or more potential points of interest associated with the one or more preferred routes.

21. The apparatus of claim 13, wherein the apparatus is at least further caused to at least:
process and/or facilitate a processing of the location information to determine one or more user groups associated with the first device; and
cause at least an association between the first device and one or more properties associated with the one or more user groups, wherein the one or more properties are based at least on a combination of one or more characteristics associated with one or more members of the one or more user groups.

22. The apparatus of claim 13, wherein the one or more characteristics include user profile information, user identification information, or a combination thereof.

23. The apparatus of claim 13, wherein the first sensed data associated with the first device includes an indication of an amount of time that the first device has been located at the potential point of interest.

24. The apparatus of claim 13, wherein the first sensor is a camera and the first sensed data associated with the first device includes image data of the area at the one or more potential points of interest.

25. A non-transitory computer-readable storage medium including program code which when executed by at least one processor causes operations comprising:

- obtaining, by a server and via at least one wireless link, location information associated with a first mobile device and a second mobile device to determine one or more potential points of interest visited by the first mobile device and the second mobile device, the one or more potential points of interest located at discrete geographical locations;
- obtaining, by the server and from a first sensor of the first mobile device via the at least one wireless link, first sensed data associated with one or more conditions of an area in which the first mobile device is situated, the area being at the one or more potential points of interest, the first sensed data being different from location information;
- obtaining, by the server and from a second sensor of the second mobile device via the at least one wireless link, second sensed data associated with the area in which the second mobile device is situated at the one or more potential points of interest, the second sensed data being different from location information;
- tagging, by the server, the one or more potential points of interest with an indication of the first sensed data associated with the area at the one or more potential points of interest and with at least one characteristic of a first user of the first mobile device;
- tagging, by the server, the one or more potential points of interest with a second indication of the second sensed data associated with the area at the one or more potential points of interest and with at least one characteristic of a second user of the second mobile device;
- validating, by the server, the one or more potential points of interest, the validating based on at least a portion of the first sensed data matching at least a portion of the second sensed data and at least one characteristic of the second user of the second mobile device matching at least one characteristic of the first user; and
- sending, by the server via a wireless network to the first mobile device, an indication of the validated one or more potential points of interest to enable display of the indication on the first mobile device, wherein the indication is generated by the server.

* * * * *